United States Patent
Ducheneaut et al.

(10) Patent No.: US 7,424,545 B2
(45) Date of Patent: Sep. 9, 2008

(54) METHODS, APPARATUS, AND PROGRAM PRODUCTS FOR PROVIDING SUPPLEMENTAL CONTENT TO A RECORDED EXPERIENTIAL DATA STREAM

(75) Inventors: Nicolas Ducheneaut, Palo Alto, CA (US); W. Keith Edwards, Atlanta, GA (US); Eric S. Nickell, Los Gatos, CA (US); James D. Thornton, Redwood City, CA (US); Daniel G. Bobrow, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 784 days.

(21) Appl. No.: 10/997,214

(22) Filed: Nov. 23, 2004

(65) Prior Publication Data
US 2006/0112344 A1 May 25, 2006

(51) Int. Cl.
*G06F 15/16* (2006.01)
(52) U.S. Cl. .................. 709/231; 709/203; 709/204; 709/213; 709/217; 709/226
(58) Field of Classification Search .............. 709/203, 709/204, 205, 213, 217, 226, 231
See application file for complete search history.

(56) References Cited

U.S. PATENT DOCUMENTS 5,559,949 A * 9/1996 Reimer et al. .............. 715/720
5,692,213 A 11/1997 Goldberg et al.
5,774,666 A * 6/1998 Portuesi .................... 725/110
5,808,662 A 9/1998 Kinney et al. .............. 348/15
5,953,005 A * 9/1999 Liu .......................... 715/243
6,081,830 A 6/2000 Schindler ................... 709/204

(Continued)

FOREIGN PATENT DOCUMENTS

EP   1 111 926 A2   6/2001

(Continued)

OTHER PUBLICATIONS

Doulamis, Anastasios D. et al. "Indexing and Retrieval of the Most Characteristic Frames/Scenes in Video Databases", Proceedings of Workshop on Image Analysis for Multimedia Interactive Services (WIAMIS '97), Louvain-la-Neuve, Belgium, Jan. 1, 1997.

(Continued)

*Primary Examiner*—Phuoc H Nguyen
(74) *Attorney, Agent, or Firm*—Park, Vaughan & Fleming LLP

(57) ABSTRACT

One embodiment of the present invention provides a computer controlled method configured to provide content to be presented with a presentation of an experiential data stream. The method includes receiving a request to provide the content which is configured to be included in the presentation of the experiential data stream, determining one or more content parameters related to the request, and providing the content. The content is structured to be able to be presented in conjunction with at least one prerecorded portion of the experiential data stream, and the content is either presented in addition to the prerecorded portion of the experiential data stream or presented instead of a target portion of the prerecorded portion of the experiential data stream.

45 Claims, 12 Drawing Sheets

U.S. PATENT DOCUMENTS

| | | | |
|---|---|---|---|
| 6,237,025 B1 | 5/2001 | Ludwig et al. | 709/204 |
| 6,243,725 B1* | 6/2001 | Hempleman et al. | 715/210 |
| 6,256,663 B1 | 7/2001 | Davis | 709/204 |
| 6,392,664 B1 | 5/2002 | White et al. | 345/717 |
| 6,519,771 B1 | 2/2003 | Zenith | 725/32 |
| 6,646,673 B2 | 11/2003 | Caviedes et al. | 348/14.07 |
| 6,671,736 B2* | 12/2003 | Virine et al. | 709/238 |
| 6,701,355 B1* | 3/2004 | Brandt et al. | 709/219 |
| 6,754,904 B1 | 6/2004 | Cooper et al. | 725/32 |
| 6,760,916 B2* | 7/2004 | Holtz et al. | 725/34 |
| 2001/0044851 A1* | 11/2001 | Rothman et al. | 709/231 |
| 2002/0010759 A1* | 1/2002 | Hitson et al. | 709/219 |
| 2002/0029381 A1 | 3/2002 | Inselberg | 725/9 |
| 2002/0056090 A1 | 5/2002 | Wagner et al. | 725/32 |
| 2002/0124263 A1 | 9/2002 | Yokomizo | 725/112 |
| 2002/0188943 A1 | 12/2002 | Freeman et al. | 725/38 |
| 2003/0002849 A1 | 1/2003 | Lord | 386/46 |
| 2003/0009766 A1 | 1/2003 | Marolda | 725/97 |
| 2003/0009771 A1 | 1/2003 | Chang | 725/135 |
| 2003/0014759 A1 | 1/2003 | Van Stam | 725/97 |
| 2003/0018967 A1 | 1/2003 | Gorbatov et al. | 725/32 |
| 2003/0056220 A1 | 3/2003 | Thornton et al. | 725/62 |
| 2003/0066074 A1 | 4/2003 | Zimmerman et al. | 725/14 |
| 2003/0101450 A1 | 5/2003 | Davidsson et al. | 725/32 |
| 2003/0147624 A1 | 8/2003 | Trajkovic et al. | 386/46 |
| 2003/0156827 A1 | 8/2003 | Janevski | 386/96 |
| 2003/0228125 A1 | 12/2003 | Trajkovic et al. | 386/46 |
| 2004/0068752 A1 | 4/2004 | Parker | 725/120 |
| 2004/0148424 A1* | 7/2004 | Berkson et al. | 709/236 |
| 2004/0172652 A1 | 9/2004 | Fisk et al. | 725/78 |
| 2004/0225728 A1* | 11/2004 | Huggins et al. | 709/223 |

FOREIGN PATENT DOCUMENTS

| | | |
|---|---|---|
| WO | WO 2005/013617 A1 | 2/2005 |

OTHER PUBLICATIONS

Greenspan, Hayit et al. "A Probabilistic Framework for Spatio-Temporal Video Representation & Indexing", A. Heyden et al. (Eds.), ECCV, LNCS 2353, pp. 461-475, 2002, Springer-Verlag, Berlin.

Iyengar, Giridharan and Lippman, Andrew B. "Videobook: An Experiement in Characterization of Video", Proceedings of IEEE Conference on Image Processing, vol. 3, pp. 855-858, 1996.

Koenen, Rob (Ed.) "Overview of the MPEG-4 Standard" International Organisation for Standardisation ISO/IEC JTC1/SC29/WG11/N4668 Mar. 2002 printed on Nov. 10, 2004 from the World Wide Web http://www.chiariglione.org/mpeg/standards/mpeg-4/mpeg-4.htm.

Yu, Hong-Heather and Wolf, Wayne "A Hierarchical, Multi-resolution Method for Dictionary-Driven Content-Based Image Retrieval", Proceedings of the International Conference Image Processing, Nov. 1997, vol. 2, pp. 823-826.

Yu, Hong-Heather and Wolf, Wayne "A Visual Search System for Video and Image Databases", Proceedings of IEEE International Conference on Multimedia Computing and Systems '97, pp. 517-524.

* cited by examiner

METHODS, APPARATUS, AND PROGRAM PRODUCTS FOR PROVIDING SUPPLEMENTAL CONTENT TO A RECORDED EXPERIENTIAL DATA STREAM

CROSS-REFERENCE TO RELATED APPLICATIONS

Published U.S. Patent Application No: US 2004/0172255 A1, filed Apr. 16, 2003, entitled Methods, Apparatus, and Products for Automatically Managing Conversational Floors in Computer-Mediated Communications, by Aoki et al. is hereby incorporated by reference in it entirety. The inventors of the instant application have assigned, or are subject to an obligation of assignment of the instant application to the assignee of application Ser. No. 10/414,923.

Published U.S. Patent Application No: US 2004/0172252 A1, filed Apr. 16, 2003, entitled Methods, Apparatus, and Products for Identifying a Conversation, by Aoki et al. is hereby incorporated by reference in it entirety. The inventors of the instant application have assigned, or are subject to an obligation of assignment of the instant application to the assignee of application Ser. No. 10/414,912.

Published U.S. Patent Application No: US 2003/0056220 A1, filed Sep. 14, 2001, entitled System and Method for Sharing and Controlling Multiple Audio and Video Streams, by Thornton et al. is hereby incorporated by reference in it entirety. The inventors of the instant application have assigned, or are subject to an obligation of assignment of the instant application to the assignee of application Ser. No. 09/951,726.

U.S. patent application Ser. No. 10/997,216, entitled Methods, Apparatus, and Program Products to Support a Shared Viewing Experience from Remote Locations, filed concurrently herewith.

U.S. patent application Ser. No. 10/997,301, entitled Methods, Apparatus, and Program Products for Presenting Replacement Content Instead of a Portion of a Recorded Content, filed concurrently herewith.

U.S. patent application Ser. No. 10/997,215, entitled Methods, Apparatus, and Program Products for Presenting Commentary Audio with Recorded Content, filed concurrently herewith.

U.S. patent application Ser. No. 10/997,302, entitled Method for Providing Commentary Audio and Additional or Replacement Video Content, filed concurrently herewith.

U.S. patent application Ser. No. 10/996,896, entitled Method, Apparatus, and Program Products for Socially Synchronizing an Experiential Data Stream, filed concurrently herewith.

U.S. patent application Ser. No. 10/997,188, entitled Method and Apparatus for Controlling an Experiential Data Stream in a Social Space, filed concurrently herewith.

U.S. patent application Ser. No. 10/997,189, entitled Methods, Apparatus, and Program Products for Aligning Presentation of Separately Recorded Experiential Data Streams, filed concurrently herewith.

U.S. patent application Ser. No. 10/997,292, entitled Method and Apparatus for Associating Commentary Audio with a Position in an Experiential Data Stream, filed concurrently herewith.

U.S. patent application Ser. No. 10/997,274, entitled Methods, Apparatus, and Program Products for Controlling Presentation of an Experiential Data Stream Responsive to Conversations in a Shared Social Space, filed concurrently herewith.

BACKGROUND

1. Technical Field

The disclosed technology and embodiments relate to the field of creating social spaces for sharing experiences from watching and/or listening to recorded audio or audio/visual information between remotely-located audience members.

2. Background Art

People socialize within a shared social space. Often this socialization occurs in the context of listening to music, watching a television program, or watching a movie within the home. Family traditions can be created, for example, by the sharing of popcorn around a favorite television program on a Sunday night. Often, a favorite movie on VCR or DVD can be watched. The fellowship engendered by this experience changes when some of the members of the social group move away or otherwise become remote from the heart of the group. This can happen, for example, when the group is a family and a child leaves to go to college. It can also happen when a group of friends graduate from college or high school. Often the person who is no longer able to be present misses the group and vice versa.

FIG. 1 illustrates a first representation of a prior art social space 100 showing a program time axis 101 extending from a program start point 103 to a program stop time 105. In this example, a first audience member 107 and a second audience member 109 are sharing the experience of watching the program in real time while the experiential data stream representing the program is being recorded as it is received at the same location (thus, local audience members—the viewers or listeners—are co-present). The playback position/playback vector 111 indicates the local audience member's playback position in the experiential data stream and the playback vector (direction and velocity). In this figure, an available content portion 113 indicates the amount of the experiential data stream that has been received and recorded while an unavailable content portion 115 indicates the amount of the experiential data stream that has not yet been received. In this figure, the local audience members experience the audiovisual representation of the experiential data stream as the data is received. This figure corresponds to two people in the same location watching a broadcast television program (or listening to an audio program) while recording the broadcast material on an audio or video tape or by use of a digital video recorder. Each local audience member can comment about, or react to, the program to the other local audience member as the program is being experienced. While the home is an example setting of this shared social space, other examples include Sports bars, local multi-player video games, audio/visual rooms in rest homes, community centers, dorm rooms, et cetera.

FIG. 2 illustrates a representation of separate prior art social spaces 200 showing a first program experience 201 and a delayed first program experience 203. The first program experience 201 has a first program start point 205 and the delayed first program experience 203 has a delayed first program start point 207. A first audience member 209 and a second audience member 211 are in a shared social space, and in the case where the experiential data stream is a video program, watching the experiential data stream at a first playback position/playback vector 213. A third audience member 215 and a fourth audience member 217 are watching the experiential data stream at a second playback position/playback vector 219. The figure also includes a real-time axis 221. The situation shown in FIG. 2 often happens, for example, when the delayed first program experience 203 and the first program experience 201 are provided over different networks (for example one provided over a broadcast network and the other provided over a cable network). This situation results in a program displacement 223 that can be small or large depending on the networks. The first program experience 201 includes a first program time axis 225 and the delayed first program experience 203 includes a delayed program time axis 227. Thus, two people watching the same program at the same point on the real-time axis 221 are viewing the experiential data stream from different points on the program time axis. A corresponding playback position 229 is included in FIG. 2 to indicate the corresponding position of the first playback position/playback vector 213 in the delayed first program experience 203 and thus indicate that each shared social space is viewing a different portion of the experiential data stream. Both FIG. 1 and FIG. 2 have no as-yet-unviewed data recorded.

FIG. 3 illustrates a third prior art social space 300. Again, we show a first program experience 301 and a second program experience 303. Each program experience being substantially the same and either completely recorded (not shown) or partially recorded using the previously described symbology. The first program experience 301 has a first program start point 305 and the second program experience 303 has a second program start point 307 that is substantially the same as the first program start point 305. FIG. 3 shows the experiential data stream that provides the subject matter that can be independently navigated by the first audience member 309 through the first program experience 301 (represented by a first playback position/playback vector 313) and being independently navigated by the second audience member 311 through the second program experience 303 (represented by a second playback position/playback vector 315). No social space is created when the two viewers independently navigate through the first program experience 301 and the second program experience 303 such as by two people separately watching a DVD or recorded program on a DVR. FIG. 3 shows that the first program experience 301 is not completely recorded, but has recorded some as-yet-unviewed data (as does the second program experience 303).

While the two audience members are not cooperating or communicating about the program experience, no social space is developed. Notice however, that the two audience members can cooperate to create the third prior art social space 300 through communication using a communication means 317 such as for example, the telephone system, wireless communication, or computer-assisted communication such as an e-mail system, instant message system, or other full- or half-duplex computer assisted communication mechanism. Thus, one audience member can coordinate navigation with the other audience member by, for example, communicating that they are pausing the program with the hope that the other audience member will also pause. The audience members can also align their playback by using countdowns, recognition of when particular scene breaks happen in the program et cetera. These methods are all clumsy. FIG. 3 also illustrates a real-time axis 321 and a first program time axis 325 and a second program time axis 327. For the third prior art social space 300 to be established and coherent, the first playback position/playback vector 313 and the second playback position/playback vector 315 need to be in approximately the same position in the respective program experiences, be on essentially the same position on the real-time axis 321 and have a means for the audience members to communicate substantially as if the audience members were all local.

Some of the background art includes interactive television, instant messaging systems, remote video conferencing, digital video, digital audio, network and computer technologies.

In addition, U.S. Pat. No. 6,519,771, System for Interactive Chat Without a Keyboard, by S. E. Zenith, filed Dec. 14, 1999 discloses techniques for combining a television signal and a networked chat room capability such that multiple people can communicate over the network at the same time that a television transmission is being received and partially displayed.

United States Patent Application Publication 2003/0101450 A1, Television Chat Rooms, by Marcus Davidsson et al., filed Jun. 17, 2002 also discloses techniques for combining a television signal and a networked chat room capability such that multiple people can communicate over the network at the same time that a television transmission is being received and partially displayed.

United States Patent Application Publication 2003/0233650 A1, Visual Group Interface for Group Connectivity, by Melora Zaner et al., filed Jun. 18, 2002 discloses a technique for creating and participating in ad-hoc groups using a network. Zaner also discloses a group audio play activity that allows group members to listen to audio in a substantially synchronous manner on each group member's computer. Zaner also discloses that every user has full control of the other group members' listening experience.

None of this art teaches the capability of aligning and/or tracking playback positions of each member's presentation of the audio or video. None of this art teaches or suggests, separately or combined, an exchange of playback positions between member's devices, a presentation of commentary audio clips with the playback, a presentation of replacement/additional content with the playback, a providing of commentary audio clips or replacement/additional content to be presented with the playback, a control device to activate social-space related commands in a device, an ability to create an commentary audio clip from transitory audio, how to determine a synchronization point for the content presented to the shared social space, how to record a commentary audio clip associated with the playback, how to have the playback device adapt to audience members' conversations in a shared social space, or a system to provide commentary audio clips and/or replacement/additional content.

It would be advantageous to provide a solution to simplify the creation and use of a shared social space for remote audience members when experiencing an experiential data stream that is partially or completely recorded. In addition, it would be advantageous to incorporate some of the disclosed technology into devices that need not directly participate in the shared social space.

DESCRIPTION OF THE PREFERRED EMBODIMENTS

Figure 1:
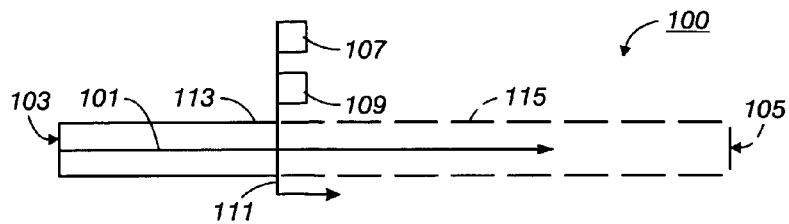
FIG. 1 illustrates a representation of a prior art social space.

One aspect of the technology disclosed herein supports the creation of a social space for audience members to mutually and simultaneously experience an experiential data stream (such as an audio/video or audio program), that has been at least partially recorded where there are both local and remote audience members. In general the audience members' devices share state including where audience members are in the experiential data stream.

Another aspect of the disclosed technology is a way to present replacement, supplemental, or additional content instead of the recorded content. For example, objectionable portions of a movie recorded on a DVD need not be presented and instead acceptable equivalent portions of the movie can be obtained and presented instead. Furthermore, advertisements can be replaced by other advertisements; additional advertisements can be added to a commercial break; and other use can be made of replacement content. In some embodiments the replacement, supplemental or additional content does not directly replace any portion of the recorded experiential data stream. Instead this other content is separately recorded and presented in place of, or in addition to portions of the experiential data stream. In other embodiments, the replacement/additional content replaces portions of or is inserted into the recorded experiential data stream.

Yet another aspect is the ability to record and playback commentary audio clips associated with the experiential data stream from the audience members or to purchase professional commentary audio clips for the experiential data stream that can be presented as portions of the experiential data stream are experienced.

Another aspect of the disclosed technology includes methods to purchase content (such as replacement/additional content and/or commentary audio clip content) specifically created to be usable with the experiential data stream.

In addition, another aspect of the disclosed technology is an innovative way to synchronize one audience member's experience to another's experience. Some of these synchronization ways also can be used by an individual to capture the context of the experiential data stream and the commentary audio clips.

A further aspect of the disclosed technology is a control device for invoking the operations of the devices to establish and maintain the shared social space.

One aspect of the disclosed technology is that of identifying where substantially similar content exists in different recordings of the experiential data stream, where the differences can be in experiential data stream format, signal noise, commercial breaks, content versions, content edits, et cetera Another aspect of the disclosed technology is that of determining where in the experiential data stream the commentary audio clips should be presented.

Still another aspect of the disclosed technology allows a device to monitor the social interaction in a social space (for example, the shared social space, the local social space and/or the remote social space) and to delay resumption of the experiential data stream (for example, after a commercial break) until those in the social space stop talking.

The foregoing and many other aspects of the disclosed technology will no doubt become obvious to those of ordinary skill in the art after having read the following detailed description of the embodiments that are illustrated in the various drawing figures.

Figure 4:
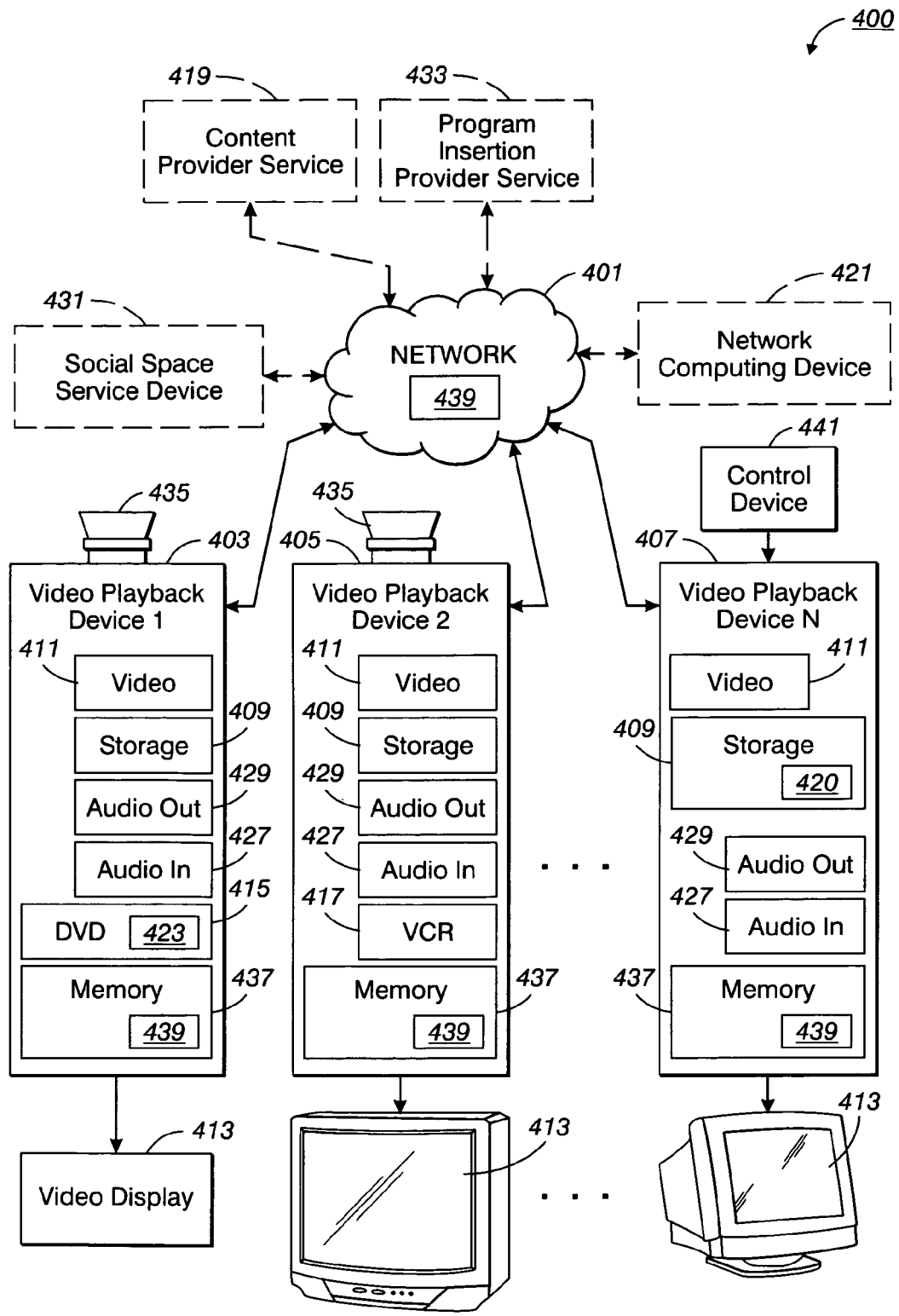
FIG. 4 illustrates one embodiment of a social television system.

FIG. 4 illustrates a social television system 400 that includes a network 401. A first video playback device 403 and at least a second video playback device 405 are able to communicate using the network 401. The social television system 400 allows audience members to experience a shared social space even if some of the audience members are remote from other of the audience members. Thus, the first video playback device 403 and the second video playback device 405 are remotely located. For example, these devices can be located in different localities such as different homes, different rooms, different time zones et cetera. These devices communicate to each other through a control link that provides direct or indirect information transfer between the devices. The control links are not numbered in FIG. 4, but are indicated by arrows. One skilled in the art will understand that the control links can be implemented in many ways depending on the architecture chosen for the implementation.

The social television system 400 can scale to allow an $N^{th}$ video playback device 407. Some of the video playback devices can include a storage component 409 such as a hard disk, other rotating media, or memory that can be used to store an experiential data stream (a multi-media program that can include a video component and/or an audio component and/or potentially other components) such as television programming, home video, digitized movie film, audio, still pictures et cetera (including digital video recorders, DVDs, CDs et cetera). The video playback device can also include a video component 411 that prepares the visual aspect (if any) of the experiential data stream for presentation to one or more local audience members through a video display component 413. Some embodiments of the first video playback device 403 can include a DVD component 415 and/or a VCR component 417 (as in the second video playback device 405). The social television system 400 can also include an optional content provider service 419 that provides an experiential data stream that, when presented to an audience member, provides an experience to the audience member. The optional content provider service 419 can provide the experiential data stream over a broadcast channel, over a cable channel, over a satellite channel, over the Internet or other LAN or WAN. The experiential data stream can be recorded on the storage component

409 as the experiential data stream can be received and stored as a recorded video/audio program 420 for later playback.

A networked computing device 421 that can be directly connected to the network 401 or indirectly connected to the network 401 (for example, through a router (not shown) or the first video playback device 403, et cetera) also can be used to supplement communications between the remote audience members and the local audience members. This capability can also be included in the first video playback device 403 as well as the others.

The experiential data stream can also be provided from a program DVD 423 that can be accessed using the DVD component 415, a VCR tape accessed using the VCR component 417, or from a computer, et cetera as well as from the recorded video/audio program 420 stored on the storage component 409 of a video playback device. Other computer readable data carriers can also be accessed to obtain the experiential data stream. One important aspect of the first video playback device 403 is that it has access to a completely or partially recorded version of the experiential data stream.

An audio input component 427 on the video playback device (or corresponding functionality on some other device such as a telephone or the networked computing device 421) can be used to capture transitory audio from the local audience members using a microphone (not shown). The captured transitory audio (as well as program audio, transitory audio or commentary audio clips received from the remote audience members and other commentary audio clips) can be reproduced using an audio output component 429 through the video display component 413 or separate audio component (not shown).

In addition, the captured audio (or other audience member communication such as instant messaging and UNIX® talk) can be processed by a conversation finder (described in the previously incorporated-by-reference published United States patent applications) to allow, for example, side conversations to occur between remote and local audience members. The conversation finder can reside on the networked computing device 421, on the local device, or distributed among some selection of devices. An example of the conversation finder is the floor analysis module 303 of FIG. 3 of the incorporated-by-reference published United States patent applications.

The microphone can be used to capture transitory audio from local audience members who are experiencing the experiential data stream. The transitory audio can also be transmitted to a remote audience member's remote device for immediate presentation to the remote audience members as part of the shared social space. The transitory audio can also be recorded as a commentary audio clip for presentation responsive to the playback position of the experiential data stream (and a copy of the commentary audio clip can also be transmitted to the remote device). In order to capture transitory audio alone without corruption from simultaneously presented audio (for example, audio from the experiential data stream, a commentary audio clip, transitory audio from a remote audience member or a mixture of these) the raw signals from the microphone can be processed by echo cancellation algorithms or other signal processing techniques as is known by one skilled in the art. These algorithms may be given as input not only the microphone signals but also the signals of the audio presented by the local device as well as characterizations of the room and audio system such as might be obtained by playing, recording, and analyzing test tones. One advantage of combining the handling of the experiential data stream, the recording of transitory audio, and the presentation of commentary audio clip in one system is the ability to perform this signal processing based on all relevant signals. The microphone may be replaced by a set of microphones in such arrangement and with such signal processing as may provide for the highest quality recording of transitory audio.

The control link used in the shared social space can be supported by a peer-to-peer or multi-cast architecture. In addition the control link can also be supported by a server architecture where communications between the video playback devices is accomplished through a shared social space service device 431 that can also be configured to maintain the state of each video playback device and to redistribute the state to the video playback devices. Thus, one embodiment allows the transmission of state from the server to all the devices.

The social television system 400 can also include an optional program insertion provider service 433 that allows replacement/additional content provided by the optional program insertion provider service 433 to be presented instead of (or in addition to) specific portions of the experiential data stream. The inventors expect that this content can be advertising content directed to the members of the shared social space as well as still pictures, replacement video segments and music. The inventors also expect that the replacement/additional content can be presented instead of targeted portions of the experiential data stream for the entire shared social space or for selected local audience members where the replacement/additional content of the targeted portions of the experiential data stream are different versions of the experiential data stream that conform to program rating requirements (or desires), parental controls or requirements of the V-chip. Further the replacement/additional content can be presented instead of commercials in the experiential data stream and/or presented to supplement the commercials in the experiential data stream. In some embodiments the replacement/additional content can be stored separately from the experiential data stream such that a subsequent presentation of the experiential data stream does not include the replacement/additional content. Other embodiments actually replace a portion of the experiential data stream or insert the replacement/additional content into the recorded experiential data stream. The replacement/additional content can also include (separately or combined with the video) commentary audio clips.

Furthermore, video or stills from a video camera 435 can be used to provide additional control and state information as well as enhancing the shared social space by allowing the remote audience members to see the local audience member (s). This picture information can be displayed within a Picture-In-Picture format or on other devices that are not shown. In addition, such video or stills can be used to determine when a local audience member enters or leaves the local viewing area (and in some embodiments, used to identify the local audience member).

The first video playback device 403, as well as the others, can also include a memory 437 that can be accessed by a CPU (not shown) and that can contain a computer program 439 to instruct the CPU to perform the processes described herein as well as other processes. The computer program 439 can be embodied in a computer-usable data carrier such as a ROM within the device, within replaceable ROM, in a computer-usable data carrier such as a memory stick, CD, floppy, DVD or any other tangible media. One skilled in the art will understand that the computer program 439 and the experiential data stream are completely different types of data. The computer program 439 causes a computer or other data processor to perform particular processes while the experiential data stream contains data that is presented to an audience member.

A control device 441 can be used to allow operator commands to be sent to any of the playback devices. Such a device can be a control panel on the playback device itself, a wired or wireless web interface, an infrared device, et cetera. Some of the inventive aspects of the embodiments are controlled by the audience member through the use of the control device 441. Some aspects of the control device 441 are subsequently described with respect to FIG. 17.

The inventors use the term "synchronization" to refer to the process used to bring the local audience member's playback position into alignment with a remote audience member's playback position. The inventors use the term "tracking" to refer to the process of maintaining the local audience member's playback position in alignment with a remote audience member's playback position. For example, activation of the "follow" user selectable control generally causes the local audience member's device to first synchronize with the followed device (hence the respective playback positions are aligned), and then having the local device monitor the difference between the playback positions and adjust the local device to track the followed remote device. Playback positions are "aligned" or in "alignment" when the difference between the playback positions is sufficiently small that the audience members who are experiencing the experiential data stream at the separate playback positions experience substantially the same content.

Audio from the remote audience members can be presented to the local audience member. If the audio from the local audience member or remote audience member is stored and indexed to the experiential data stream (such as with an audio trigger position) that audio is considered to be commentary audio clip in that commentary audio clip can be reproduced during an experience of the experiential data stream. Transitory audio (audio that is not a commentary audio clip—thus not, or not yet, indexed to the experiential data stream) can also be presented to the appropriate audience members near the real time the transitory audio is uttered, but will not be stored for presentation in subsequent experiences of the experiential data stream. The commentary audio clip has an audio duration that is the time required to utter the commentary audio clip (the audio duration can be adjusted by changing the playback speed for the commentary audio clip with or without pitch compensation).

The local audience member can separately enable or disable presentation of each commentary audio clip, enable or disable presentation of groups of commentary audio clips, record their own commentary audio clips, and can combine selected commentary audio clips to make a group of commentary audio clips (possibly subject to copyright protection mechanisms).

The commentary audio clips can be grouped and provided individually or in groupings. Thus, a local audience member can obtain a commentary audio clip group that is a series of commentary audio clips made by, for example, a single expert on the content presented in the experiential data stream. Other commentary audio clips can be grouped by remote audience member's device identifications and/or date and time. Multiple commentary audio clip groups can be enabled to be presented during the presentation of the experiential data stream.

The commentary audio clips can contain content that is analysis audio, opinion audio, critical audio, parody audio, entertainment audio or participant audio related to said experiential data stream. Thus, an audience member can obtain and/or purchase commentary audio clips that provide audio analysis and/or opinion and/or critique by an expert on the experiential data stream, that provide parodies the experiential data stream, that provides an audio enhancement for the experiential data stream to further entertain the audience member and/or that provide commentary by a person who participated in the creation of the experiential data stream.

Figure 2:
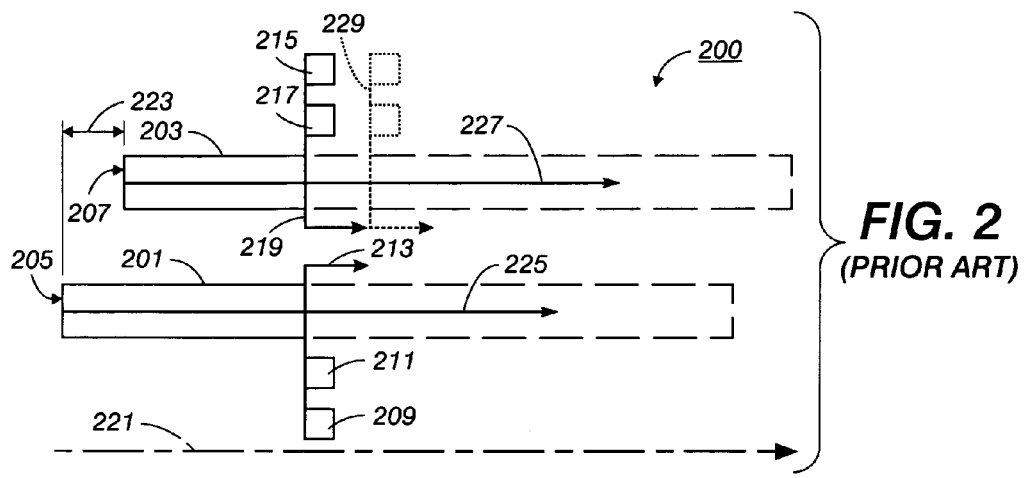
FIG. 2 illustrates a representation of separate prior art social spaces.
Figure 3:
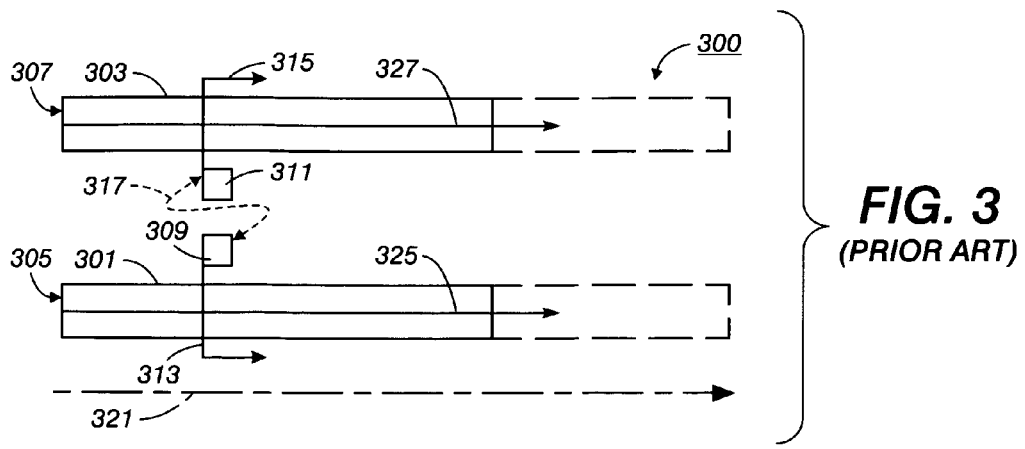
FIG. 3 illustrates a representation of another prior art social space.
Figure 5:
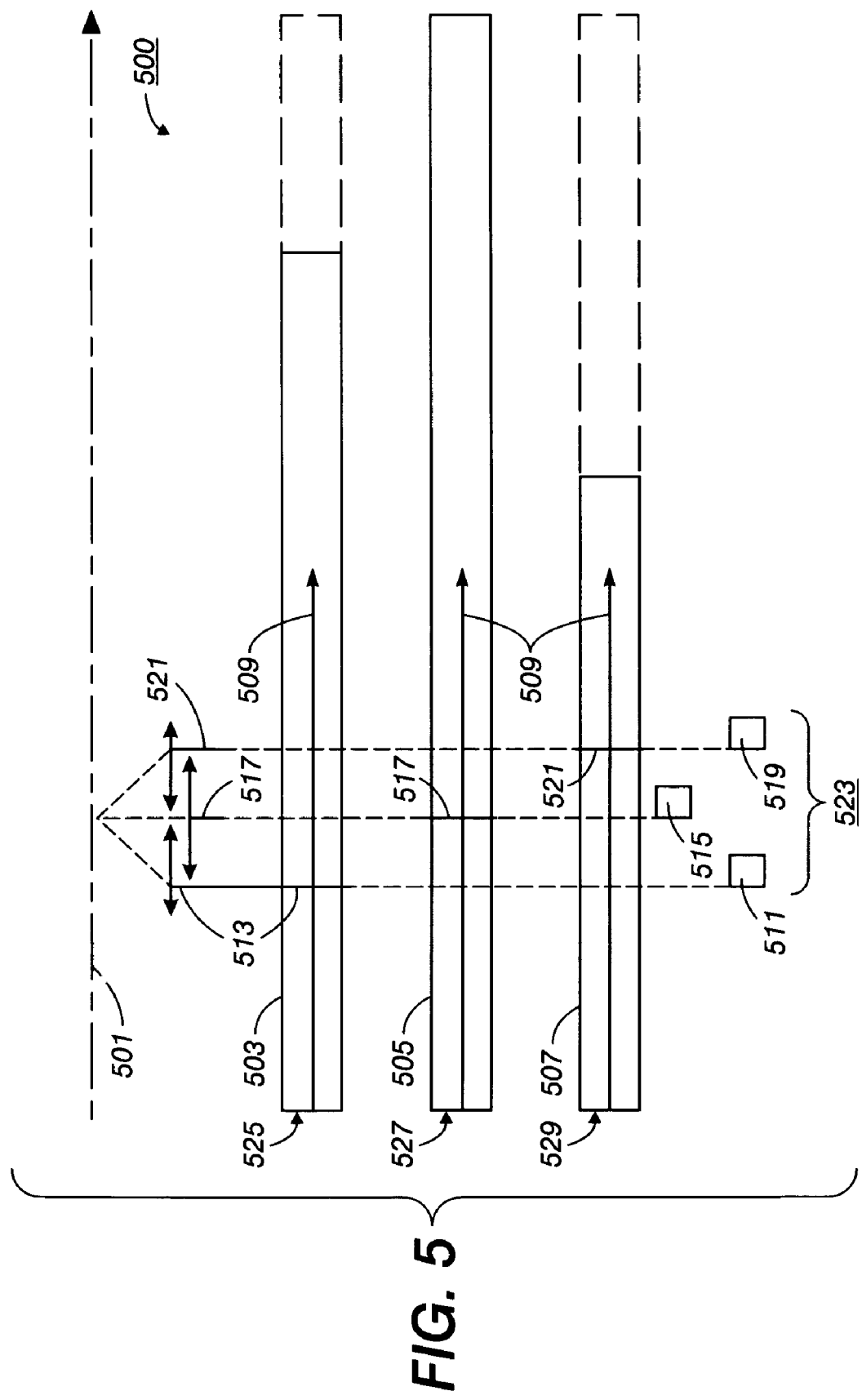
FIG. 5 illustrates the environment of a social television system in accordance with one embodiment.

FIG. 5 illustrates a social television system experience 500 that is enabled by the social television system 400 without the problems inherent in the prior art systems of FIG. 1 through FIG. 3. This representation of the social television system experience 500 includes a real time axis 501, a first recorded program 503, a second recorded program 505 and a third recorded program 507. Each of these programs can be completely or partially recorded (for example, if the audience members have recorded the same satellite television program from different feeds). These recorded programs can also reside on DVDs, or be a mixture of DVD and recorded feed or other heterogeneous mixture of experiential data stream formats.

The recorded programs have a program time axis 509. For discussion purposes, recorded video programs are assumed to be in MPEG-2 format having a group-of-pictures (GOP) organization of I-frames, B-frames and P-frames. Other modern video recording formats have similar characteristics such that one skilled in the art can apply the teachings herein to those formats.

In this social television system experience 500, a first audience member 511 is navigating through the first recorded program 503 at a first playback position/playback vector 513; while a second audience member 515 is navigating through the second recorded program 505 at a second playback position/playback vector 517; and while a third audience member 519 is navigating through the third recorded program 507 using a third playback position/playback vector 521. Each audience member's playback position is shown at a different point on the program time axis 509 but at the same point on the real time axis 501.

Using embodiments of the subsequently described inventive technology, the first audience member 511, the second audience member 515, and the third audience member 519 form a shared social space 523 even if some of the audience members are located remotely from the others. One aspect of the shared social space is that, in general, the audience members' playback positions and playback vectors are often substantially the same.

Some of the difficulties in establishing the shared social space 523 are that the actual start positions (a first program start point 525, a second program start point 527, and a third program start point 529) may be different for each of the recorded programs. Thus, some embodiments are disclosed that locate a common reference point for the start of the recorded program. Another difficulty occurs when the playback positions of the audience members are different such that one or more audience members are out of alignment with other of the audience members (thus, reducing the coherency of the shared social space). Another difficulty is that the playback vector may be different for some of the audience members such that the respective playback positions move out of alignment. Yet another difficulty is that existing DVR and DVD device controls do not provide for the ability to align the audience members within the shared social space 523. Still another difficulty is that the audience members need to be able to communicate about the program within the shared social space 523. This communication in the shared social space 523 needs to be compatible with traditional interpersonal communication by audience members in, for example, the first representation of a prior art social space 100 of FIG. 1.

The playback vectors in FIG. 5 are shown with different directions and lengths to indicate that these vectors can be adjusted through audience member command or automatically to keep the shared social space 523 coherent. Some of these techniques are subsequently described with respect to at least FIG. 16.

One advantage of the shared social space 523 is that the separate audience members can interact with each other in a manner as if they were in the same physical location. In one embodiment, one audience member (a master audience member) can be designated to operate a control device. In this instance, as all the other audience members are slaved to the master, the master's operation of the control device will also control the viewing of the experiential data stream by the other audience members. In another embodiment, each audience member can "follow" a specific audience member, or follow a virtual audience member. The virtual audience member can be the mean/median playback position calculated from all or some selection of the audience members. Some embodiments also allow an alignment control that allows one audience member to reach alignment with and synchronize playback with another audience member either as a jump synchronization, or over a period of time to allow the local audience member to maintain context while reaching alignment through use of, for example, a context-displayed synchronization or a social-context synchronization. Other embodiments allow each audience member to use their control to affect all the other audience members in the shared social space (for example, any audience member can pause all audience members' devices).

One skilled in the art will understand that each audience member needs to have a prerecorded (at least partially) version of the experiential data stream (the program) that is substantially the same as that recorded by the other audience members. The experiential data stream can be an audiovisual program completely, partially, or a mixture of completely or partially (for example, completely recorded in one time zone while being recorded in another time zone), recorded on a DVR, a program recorded on a DVD, a recorded audio file in any format that can be stored et cetera It is important to realize, that none of the audience members' devices are supplying the experiential data stream to other audience members' devices. Each device can be providing both playback of the experiential data stream to the associated audience member and at least information across the control link of its internal state to the other devices. The control link can also be used to transfer audio and/or picture information between the audience members.

In addition, the audio received from a remote audience member can be recorded and indexed to the remote audience member's playback position at the time the audio was uttered when the audio is stored on the local audience member's device. Thus, commentary audio clips uttered by a remote audience member having a playback position ahead of the local audience member's playback position, can be stored and indexed to the remote audience member's playback position (the audio trigger position). The commentary audio clip can be presented to the local audience member when the local audience member reaches the audio trigger position in the experiential data stream. In addition, commentary audio clips uttered by a remote audience member can also be indexed to the experiential data stream irrespective of the playback position of the local audience member and irrespective of whether the experiential data stream has yet been recorded by the local audience member's device at the audio trigger position.

Figure 6:
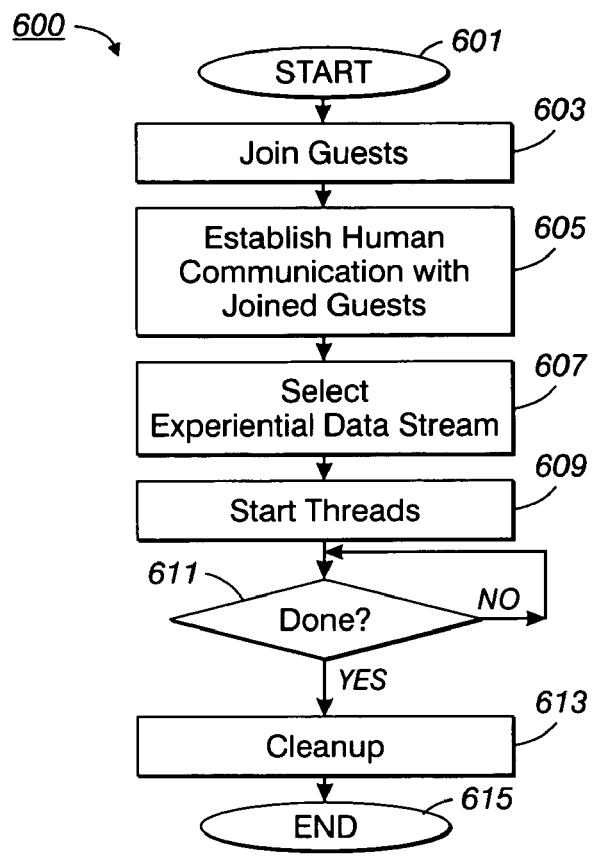
FIG. 6 illustrates a high-level view of the operation of one embodiment.

FIG. 6 illustrates a high level shared social space process 600 that shows an overview of the procedures used by one embodiment. The high level shared social space process 600 initiates at a start terminal 601 responsive to a command from a prospective audience member. A 'join guests' procedure 603 allows the prospective audience member to be added to the shared social space. Many techniques exist that can be used to accomplish this. These techniques include using a web-based enrollment, techniques similar to instant message (IM) buddy chat, techniques similar to selecting players in a multi-player computer or video game, et cetera. Furthermore, the 'join guests' procedure 603 can be automated for the audience members such that the expected experiential data stream is automatically recorded at each audience member's device, and the shared social space established at an agreed-upon time.

An 'establish human communication' procedure 605 can establish a human communication channel for human communication between the joined audience members through traditional means or by use of the control link.

At some point, an agreement is reached by the audience members who have joined the shared social space as to what experiential data stream they desire to experience. This agreement can be accomplished by a 'select experiential data stream' procedure 607.

The 'join guests' procedure 603 and the 'establish human communication' procedure 605 can be accomplished through heterogeneous communication mechanisms as well as homogeneous communications. The human communication channel can be established using, for example, but without limitation, VoIP, POTS, the control link, instant message, e-mail, a text-based communication capability, web page enrollment capability, and computer-assisted audio. One skilled in the art will understand that there are many ways to select the experiential data stream for use in the shared social space (for example, this functionality can be included in the 'join guests' procedure 603). Information received over the human communication channel can include text, video, still pictures, audio data, and any data that can be converted to audio form, text form, video form, or picture form. For example, textual information can be converted into computer generated audio that represents the text and that audio can be immediately presented (as transitory audio) or presented and stored (capable of being presented) as a commentary audio clip.

Figure 7:
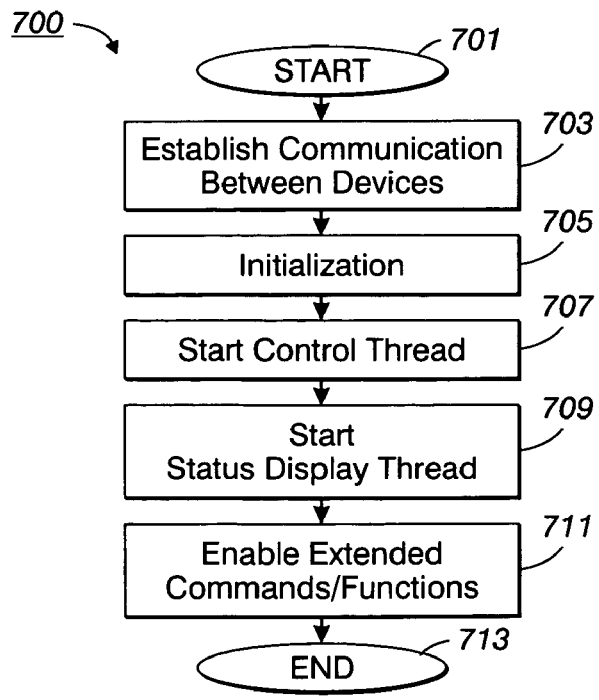
FIG. 7 illustrates a thread initiation process that can be used in one embodiment.

Once the audience members are joined and the experiential data stream selected for the shared social space, a 'start threads' procedure 609 invokes the process illustrated in FIG. 7 to initiate the threads that provide the inventive services in this embodiment.

Once the threads are started, the high level shared social space process 600 continues to a 'completion' decision procedure 611 that detects when the local audience member wishes to leave the shared social space. While the local audience member remains in the shared social space, the high level shared social space process 600 periodically loops back to the 'completion' decision procedure 611. When the local audience member commands an exit from the shared social space (or if an exit condition is otherwise detected), the high level shared social space process 600 continues to a 'cleanup' procedure 613 that terminates executing threads, releases resources used by the high level shared social space process 600 as well as any other thread associated with establishment and maintenance of the shared social space 523. Finally, the high level shared social space process 600 completes through an end terminal 615.

FIG. 7 illustrates a thread initiation process 700 that can be invoked by the 'start threads' procedure 609 of FIG. 6. The thread initiation process 700 initiates at a start terminal 701 and continues to an 'establish device communication' procedure 703 that establishes communication over the control link (using for example but without limitation, UDP or TCP protocols) between the relevant devices comprising the shared social space and/or supporting the shared social space (for example, the shared social space service device 431).

Once communication is established between the relevant devices, the thread initiation process 700 continues to an 'initialization' procedure 705 that initiates the input and output state exchange threads and that is subsequently described with respect to FIG. 8.

A 'start control thread' procedure 707 initiates the control thread that is subsequently described with respect to FIG. 14.

In addition, a 'start status display thread' procedure 709 initiates the display thread that is subsequently described with respect to FIG. 10.

Once the input and output state exchange, control, and status display threads (as well as any other ancillary service threads) are established, an 'enable extended commands/functions' procedure 711 enables extended commands and functions such as the shared social space that enable interaction between the audience members and between their relevant devices in the shared social space as well as extended commands and functions for processing commentary audio clips and other shared social space and stand-alone features disclosed herein.

Once the service threads are established and the shared social space functions enabled, the thread initiation process 700 terminates via an end terminal 713.

One skilled in the art will understand that the relevant devices are determined depending on the type of communication architecture used to support the shared social space. In a peer-to-peer architecture, the relevant devices would generally consist of each audience member's device that can access the experiential data stream. In a client server architecture, the relevant device could simply be an identified computer that accumulates and distributes information from each audience member's device to the other audience members' devices.

Figure 8:
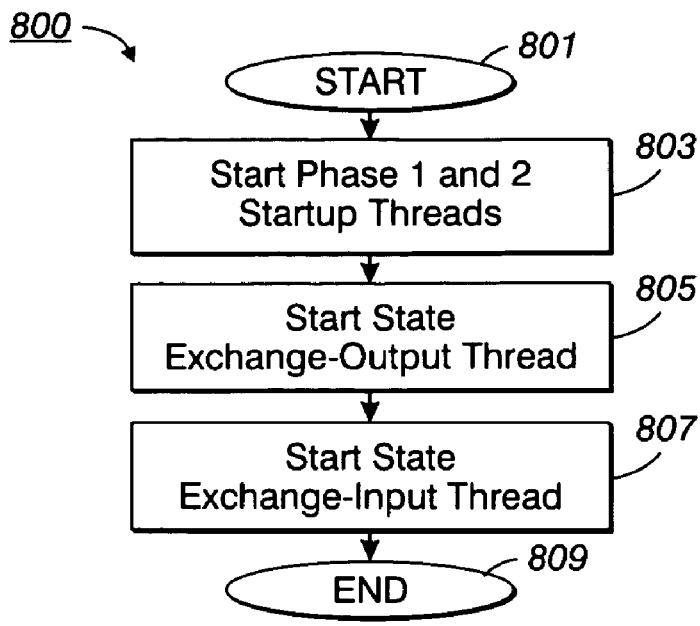
FIG. 8 illustrates an initialization process that can be used in an embodiment.

FIG. 8 illustrates an initialization process 800 that can be invoked by the 'initialization' procedure 705 of FIG. 7, that initiates at a start terminal 801 and continues to a 'start threads for phase 1 and 2 startup' procedure 803. The 'start threads for phase 1 and 2 startup' procedure 803 starts the threads used to determine a starting point in the experiential data stream recorded in each of the audience members' devices. The 'start threads for phase 1 and 2 startup' procedure 803 is subsequently described with respect to FIG. 12 and FIG. 13.

Then the initialization process 800 continues to a 'start state exchange-output thread' procedure 805 that initiates a thread that is subsequently described with respect to FIG. 9.

In addition, a 'start state exchange-input thread' procedure 807 initiates a thread that is subsequently described with respect to FIG. 11. Once the state exchange threads are initiated the initialization process 800 completes via an end terminal 809.

Some embodiments can include an audio input thread (not shown) and/or a video input thread. These threads can be used to capture local transitory audio or video for transmission to the remote audience members (and, in some embodiments, the captured transitory audio or video can be processed by a conversation finder or an image recognition system).

Figure 9:
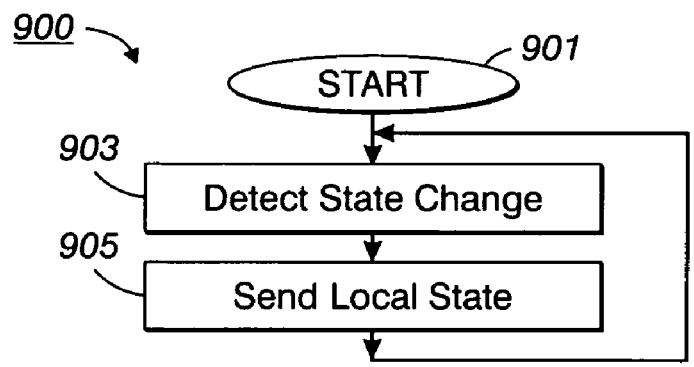
FIG. 9 illustrates a state exchange-output thread in accordance with one embodiment.

FIG. 9 illustrates a state exchange-output thread 900 that can be invoked by the 'start state exchange-output thread' procedure 805 and that initiates at a start terminal 901. Once initiated, a 'detect state change' procedure 903 detects a state change in the local audience member's device. Once a state change is detected, a 'send local state' procedure 905 sends the changed state of the local audience member's device to the other audience members' devices (in accordance with the architecture being used). The state exchange-output thread 900 then continues back to the 'detect state change' procedure 903 to detect the next state change. One component of the information that can be sent by the state exchange-output thread 900 (when the experiential data stream is in the MPEG-2 format) is the identification of the next Group of Pictures (GOP) that will be displayed by the local audience member's device.

One skilled in the art will understand that another embodiment may use synchronous transmission of the device's state such that the state can be periodically sent (changed or not).

Figure 10:
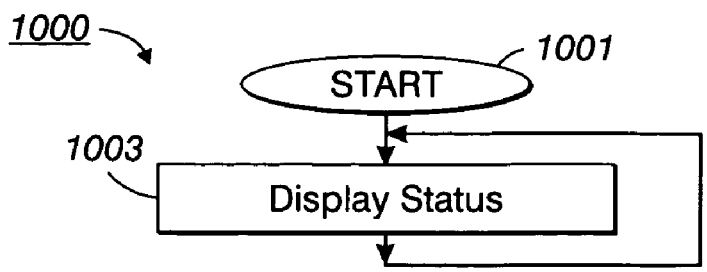
FIG. 10 illustrates a display shared social space status thread that can be used in one embodiment.

FIG. 10 illustrates a display thread process 1000 that can be invoked by the 'start status display thread' procedure 709, that initiates at the start terminal 1001 and continues to a display status 1003 that detects a change of state for one or more of the audience members' devices and displays the new or changed status; or causes the new or changed status to be displayed. Once the status is displayed, the display thread process 1000 loops back to the display status 1003. The status can be of the local audience member's device, of the shared social space, or any other status of interest to a local audience member.

Figure 11:
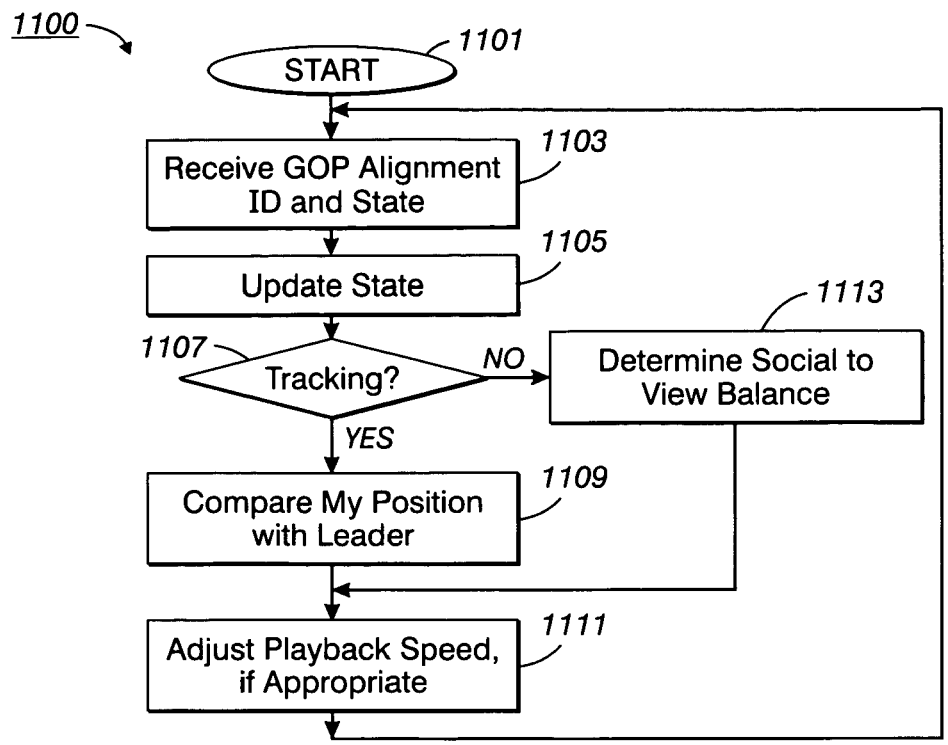
FIG. 11 illustrates a state exchange-input thread that can be used in an embodiment.

FIG. 11 illustrates a state exchange-input thread 1100 that can be invoked by the 'start state exchange-input thread' procedure 807, initiates at a start terminal 1101 and continues to a 'receive GOP alignment ID and state' procedure 1103. The 'receive GOP alignment ID and state' procedure 1103 receives state information (or change of state information) as well as a group of pictures (GOP) alignment identification (in an embodiment that has a group of pictures, for example MPEG-2) from the audience member's device that indicates the audience member's playback position in the experiential data stream. On receiving the GOP alignment ID, an 'update state' procedure 1105 updates the state of the identified device. A 'tracking' decision procedure 1107 determines whether the device that received the GOP alignment ID is tracking the playback position of a remote device.

If the device that received the GOP alignment ID is tracking or is in one of the "syncing" states, the state exchange-input thread 1100 continues to a 'compare playback position with leader' procedure 1109 that compares the local audience member's playback position in the experiential data stream with the remote audience member's playback position in the experiential data stream.

In some embodiments that support heterogeneous formats for the experiential data stream, the process for tracking can be refined accordingly. For example, if the followed audience member fast-forwards past a commercial break that does not exist in the format of the local audience member's experiential data stream, the local audience member's device pauses or slows while the followed audience member fast-forwards instead of attempting to skip content that does not exist in the format of the experiential data stream experienced by the local audience member.

In some embodiments an 'adjust playback vector' procedure 1111 adjusts the playback vector of the experiential data stream for the local audience member so that the local audience member's viewing experience will align with the playback position of the remote audience member over a period of time (for example, as in a context-displayed synchronization or a social-context synchronization—subsequently described with respect to FIG. 16). Thus, the local audience member is exposed to the context of the intervening portion of the experiential data stream while synchronizing with the remote audience member. The audio playback can also be adjusted to keep the transitory audio and/or commentary audio clips in synchronization with the experiential data stream by any of a number of techniques well known in the art (for example, pitch compensation). In other embodiments, the 'adjust playback vector' procedure 1111 simply "jumps" to the remote audience member's playback position. Yet other embodiments provide both mechanisms. Additional details related to the process of aligning the local audience member's playback position with a remote audience member's playback position are subsequently provided with respect to FIG. 16. One skilled in the art would understand how to implement and coordinate the 'adjust playback vector' procedure 1111 with the process described with respect to FIG. 16.

Some embodiments require that the viewing distance between playback positions be larger than a threshold before adjusting the playback vector. This reduces speed oscillations in the playback. One skilled in the art will understand that the playback vector of the remote audience member's device will need to be determined and incorporated into this computation if that device's playback vector is other than nominal. From this disclosure as a whole and from the above, such a one will also understand that the device also monitors its own playback position.

The state exchange-input thread 1100 then returns back to the 'receive GOP alignment ID and state' procedure 1103. The state exchange-input thread 1100 and the synchronize with remote audience member process 1600 (subsequently described with respect to FIG. 16) can cooperate to establish and maintain alignment of the playback positions of the local audience member and the followed remote audience member (by tracking the remote audience member's playback position). However, one skilled in the art will understand that some embodiments allow a local audience member to align with a remote audience member without requiring that the two audience members remain in alignment.

If the 'tracking' decision procedure 1107 determines that the local audience member is not in the "following" state, the state exchange-input thread 1100 continues to a 'determine social/view balance' procedure 1113 that evaluates the social versus viewing balance and determines whether and how to adjust the playback of the experiential data stream accordingly.

From experiments performed by the inventors, it is clear that audience members are very good at knowing when they can start talking between themselves in response to lulls in the experiential data stream (such as during commercials, lulls in dialog et cetera). The difficulty is that once the audience members start a conversation, they find it much harder to stop the conversation when the experiential data stream again becomes interesting. Thus, the social conversation between the audience members can overlap with the resumption of interesting program content.

The 'determine social/view balance' procedure 1113 can monitor the utterances vocalized by the audience members (either just the local audience member or all the audience members in the shared social space) and can also monitor characteristics of the experiential data stream. For example, as the end of a commercial break approaches and if the audience members' audio streams are sufficiently active, the 'determine social/view balance' procedure 1113 can condition the 'adjust playback vector' procedure 1111 to slow or pause, the presentation of the experiential data stream; or present other material instead of the experiential data stream until the audience members have finished their conversation and are ready to resume experiencing the experiential data stream. Thus, the 'determine social/view balance' procedure 1113 can determine when the audience members have completed their conversation and can resume nominal playback accordingly by conditioning the 'adjust playback vector' procedure 1111. Thus, the first video playback device 403 can adjust to become less disruptive to the audience members within the shared social space.

In addition, the 'determine social/view balance' procedure 1113 can optionally determine whether the audience members' conversations have reached a level where the audience members are substantially engaged in social conversation and not experiencing the experiential data stream as presented (thus, the audience members' conversations should have priority over the presentation of the experiential data stream). In this situation, some embodiments can disable the presentation of the experiential data stream and can present replacement/additional content such as an advertisement provided by the optional program insertion provider service 433 instead of the content from the experiential data stream until the audience members' conversations complete or slacken (thus providing a non-scheduled commercial break).

An audience member's device that is tracking can still be subject to the operation of the 'determine social/view balance' procedure 1113. For example, the tracked device has access to the amount of conversations in the shared social space. If the tracked device performs as above, the tracking devices can follow the tracked device accordingly.

A conversation finder can be used in some embodiments to help determine the social/view balance by, for example, monitoring the local and remote utterances to detect active conversations between the audience members.

In some embodiments, once the start of a commercial break is detected, and if each of the audience members' devices have recorded data of the experiential data stream that extends past the commercial break, each audience member's device can simply fast forward or skip to the portion of the experiential data stream that resumes after the commercial break—thus skipping past the commercial break.

As just mentioned, during the period when the audience members are conversing, other material such as replacement/additional content can be presented instead of the content from the experiential data stream. The concept of replacement/additional content can be expanded to use remotely or locally stored still pictures or slide shows, locally stored video, additional commercials provided by the optional program insertion provider service 433, images of some number of audience members, et cetera Once the 'determine social/view balance' procedure 1113 determines that the audience members have completed their conversation, it can immediately enable the presentation of the experiential data stream thus resuming the experiential data stream, or it can wait until the currently presented material completes (thus allowing for the replacement/additional content, for example an inserted advertisement, to complete prior to enabling the resumption of the presentation of the experiential data stream). Because each remote audience member's device may have different length commercial breaks from that of the local audience member's device, the 'determine social/view balance' procedure 1113 can also determine when all of the audience members' devices have completed their commercial break period.

The replacement/additional content can be provided from the optional program insertion provider service 433 or from storage on the local audience member's device or network. The replacement/additional content can be, for example, but without limitation, a still picture, a status display of the shared social space, a text and/or graphical representation of the shared social space, a slide show of still pictures, additional advertising, images of audience members, or other content related to or unrelated to the experiential data stream. Furthermore, when the 'determine social/view balance' procedure 1113 detects a commercial break in the experiential data stream, it can condition the 'adjust playback vector' procedure 1111 to partially or completely replace the content of the commercial break with replacement/additional content (including extending the commercial break to provide additional advertising). Thus, the presented advertisements can be targeted to individual audience members and/or to the shared social space.

Furthermore, replacement/additional content can be presented instead of a portion of the experiential data stream content to accommodate supplemental content, parody content, comedy content, content responsive to parental controls, V-chip requirements, or program rating requirements or desires. The replacement content can be selected based on any selection criteria such as, or similar to the above, or implied herein. In some embodiments the selection criteria can be specified or influenced by the audience member (for example with rating preferences). In some embodiments the selection criteria can be specified or influenced by the provider of the replacement/additional content (for example, by a provider of advertising content). Some embodiments can provide support for both of these. In some embodiments, the selection criteria can be provided to the optional program insertion provider service 433 as a content parameter in the request for content.

In addition, the replacement/additional content can also be used to present "director's cut" additional content in addition to the content in the recorded experiential data stream as well as providing alternate endings. Furthermore in a shared social space where there is a heterogeneous experiential data stream environment (for example, where the local audience member is using a DVD while a remote audience member is using a recorded satellite feed that includes advertisements) the remote audience member's device can detect a commercial break and provide the local audience member's device with that state information. The local audience member's device can then present advertisements provided by the optional program insertion provider service 433 during the period that the commercial break is imposed on the remote audience member. Thus, for example, advertisements can be included in the presentation of the content of a DVD even though there are no advertisements contained in the experiential data stream recorded on the DVD.

One skilled in the art will understand that replacement/additional content can be provided from the optional program insertion provider service 433 in a push mode, a pull mode, a cache preload mode, a tangible media mode, or other delivery mode. In addition, one skilled in the art will understand how to provide records back to the optional program insertion provider service 433 to account for viewings. Such a one will also understand that the same replacement/additional content can be displayed to all audience members in the shared social space as well as having different replacement/additional content targeted to some or all of the audience members' devices.

The replacement/additional content can be configured to specify which portion of the experiential data stream the replacement/additional content replaces. This can be accomplished by specifying or otherwise identifying an insertion coordinate and a resumption coordinate in the experiential data stream for which the replacement/additional content is to be substituted during presentation. For example, if the insertion coordinate and the resumption coordinate are the same, the replacement/additional content is presented at that point in the experiential data stream and no content from the experiential data stream is lost. If the coordinates define a portion of the experiential data stream, the replacement/additional content is presented instead of the content within that portion of the experiential data stream. At completion of the presentation of the replacement/additional content, the presentation of the experiential data stream can continue starting at the resumption coordinate specified in the replacement/additional content.

The replacement/additional content can also be configured to filter portions of the video generated by the experiential data stream. For example, the replacement/additional content can include masking information, pixilating information, transparency information et cetera that can be applied to the video generated by the experiential data stream to obscure, enhance, pixilate portions of a video frame generated by the experiential data stream.

One skilled in the art will understand that there exist other techniques that can be used to identify a portion of the experiential data stream to be replaced such that absolute coordinates need not be specified within, or associated with the replacement/additional content. In such embodiments, the insertion coordinate and the resumption coordinate will generally be determined so that the device can detect proximity of its playback position in the experiential data stream with the insertion coordinate. Such a one will also understand there exist many equivalent ways to differentiate between insertion content and replacement content that are equivalent to what is described herein.

One aspect of the technology disclosed herein is a server for the replacement/additional content that resides on the network 401 and provides the replacement/additional content responsive to a request for the replacement/additional content from an audience member's device. This request can be invoked by the audience member in many ways, for example by the audience member explicitly invoking the request, by the audience member conditioning the audience member's device to issue the request periodically, or in a response to satisfaction of one or more conditions for issuing the request. Furthermore the request can be submitted by the audience member to the server though a web or other user interface, by telephone, by e-mail, or by any other process used to request information from the server. This request can be configured to cause the server to provide the replacement/additional content according to parameters within the request including whether the replacement/additional content is to be provided in a push mode, a pull mode, a cache preload mode, et cetera. The request can also include content parameters to condition the content selection according to the audience member's preferences. The replacement/additional content can be used to supplement the experiential data stream such as presenting the replacement/additional content in addition to, or instead of content in the recorded experiential data stream. The content parameters can include an identification of the experiential data stream, user specified parameters that can be used to better select targeted advertising for the audience member, experiential data stream format (for example, letterbox or normal presentation), content limitations (for example content rating limitations), et cetera One function of a first startup phase thread 1200 and a second phase startup thread 1300 (both invoked from the 'start threads for phase 1 and 2 startup' procedure 803 and subsequently described with respect to FIG. 12 and FIG. 13) can be to verify that the experiential data stream available at the local audience member and the remote audience member are substantially similar as well as to determine the starting point within the experiential data stream for the audience members. It is instructive to evaluate some of the possible arrangements of the experiential data stream under consideration.

The first and simplest situation is where each audience member has the same version of the experiential data stream (for example, where each audience member has a DVD of the same version of a movie). In this case, each I-Frame and GOP is identical and the start GOP can be the first GOP. The synchronization GOP (see below) can also be the first GOP or some future GOP.

A second situation is where each audience member is receiving a feed from the same high-quality channel. For example, a United States West Coast Satellite feed of a particular program on the same channel will have the characteristics that should be handled when setting up a shared social space. In particular, we assume that a significant portion of the start of the program or the entirety of the experiential data stream is already recorded (such as by a DVR). Some of the issues that must be considered in this situation are that each audience member's DVR may not have started recording at the same time; that the internal clocks of each individual DVR may not be the same; that different audience members will have different signal drop outs from local interference; and that the different audience members may have recorded the same program in different formats (for example, widescreen versus normal).

In this situation, we must verify that the selected experiential data stream at the local audience member's device and the one at the remote audience member's device are substantially similar. Then we must locate a starting GOP where not all of the initial GOPs in the experiential data stream are available to all audience members. In addition, not all of the GOPs need be identical because of local interference (for example, drop-outs from passing airplanes disrupting satellite communication, storms, interference from lightning, et cetera) that may have corrupted the signal recorded by the DVR. Thus, in this situation, we need to determine the start point for the experiential data stream and determine where in the experiential data stream we expect the audience members to align.

The need for a synchronization GOP (or other synchronization point) is the result of allowing those who have completely recorded the start of the experiential data stream to view that portion of the experiential data stream while still allowing others who did not record the start of the experiential data stream to be able to align with those that did. Determining the starting GOP and synchronization GOP is made more difficult because some of the recorded GOPs may be different between the audience members.

A third situation is where some of the audience members record the experiential data stream off of one channel, while other audience members record off a different channel. For example, the same experiential data stream, but from an East Coast Feed versus the West Coast Feed. In this case, the experiential data stream is sent at different GMT times. Thus, some audience members may have the entire program recorded, while others have only a partial recording. In addition, the commercials may be dependent on the feed.

Yet another situation is where some of the audience members are on a cable channel in various cities, some on a satellite channel, yet others are recording the experiential data stream from a broadcast channel in various cities. In this situation, there can be significant differences in the recorded content between each of the audience members. These differences include different commercials, different amounts of interference, and different editing of the experiential data stream.

Yet another situation is where the one or more DVRs stores the experiential data stream in a different format than other of the DVRs. Embodiments can address these conditions separately or in combination.

Yet another situation that can apply to each of the previously described situations is when a non-member of the shared social space desires to join the shared social space after the existing audience members have started experiencing the experiential data stream. In this case the experiential data stream recorded on the non-member's device may not have initial data for the complete experiential data stream.

One skilled in the art will understand the experiential data stream at each audience member's device is generally substantially similar, and that the playback position provided by the remote audience member's device to the local audience member's device is related to the local audience member's experiential data stream. Where the experiential data streams are identical and without replacement/additional content, the received playback position is strongly related to the local audience member's experiential data stream. Where, for example, the local audience member's experiential data stream is from a DVD and the remote audience member's experiential data stream has been recorded from a broadcast, the playback position provided by the remote audience member's device is related to the local audience member's experiential data stream. In such configurations, periodic re-alignments may be required using techniques similar, for example, to those described with respect to FIG. 12.

I-Frames and/or GOPs (or any other audio, visual and/or video unit in the experiential data stream—collectively referred to as a content sample) can be characterized by numerous methods (such as preparing a checksum, a cyclic redundancy check, a digest or any other technique that can, with high probability, determine whether two blocks of data are identical) from the image portion of the I-Frame to characterize the I-Frame as a function of the visual data contained in the I-Frame. In addition, I-Frames can be characterized by determining statistical values of the GOP associated with each I-Frame to determine if the I-Frames are substantially similar. Furthermore, I-Frames can be characterized by the time-stamps within the I-Frame. One skilled in the art will understand that characterizations similar to these can be applied to data streams that are not in the MPEG-2 format. The audio information in the content sample can also be characterized.

In addition, GOPs can be characterized by numerous methods to detect substantially similar GOPs. These methods, known to one skilled in the art include feature extraction techniques for color, texture, shape, motion and audio features and can generate a multidimensional vector that characterizes the GOP. These characterizations can also be used to determine the most similar GOP between in each audience members' experiential data stream.

Figure 12:
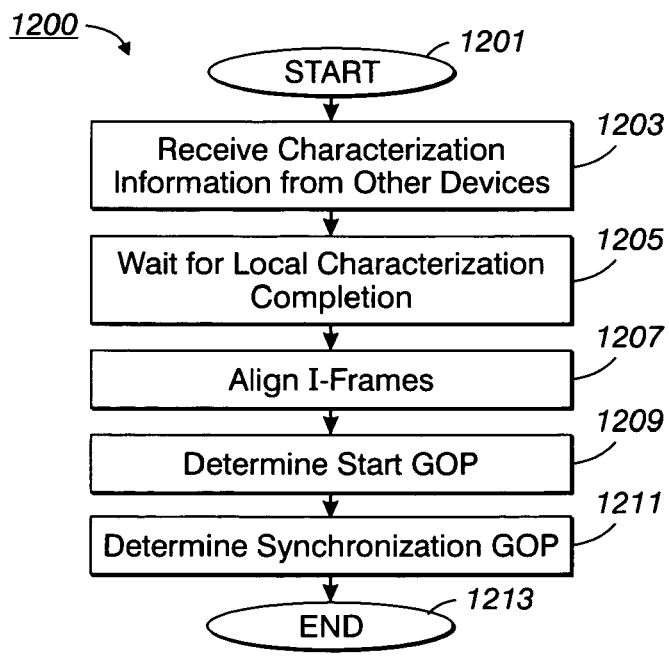
FIG. 12 illustrates a first startup phase thread that can be used in an embodiment.

FIG. 12 illustrates the first startup phase thread 1200 that can be invoked by the 'start threads for phase 1 and 2 startup' procedure 803 of FIG. 8, initiates at a start terminal 1201, and continues to a 'receive characterization information' procedure 1203. The 'receive characterization information' procedure 1203 receives characterization information from the control link that was sent by a 'send characterization information' procedure 1309 that runs in the remote devices and that is subsequently described with respect to FIG. 13. One skilled in the art will understand that the 'receive characterization information' procedure 1203 can be implemented as a thread and that subsequent condition flags (not shown) can be used to indicate when characterization information is received from all or a selection of audience members' remote devices. A 'wait for local characterization completion' procedure 1205 determines when the I-Frames/GOPs (or other content samples) on the local device have been characterized. After the local I-Frames/GOPs are characterized, and characterizations of content samples from all or a sufficient number of remote devices have been received over the control link, the first startup phase thread 1200 continues to an 'align I-frames' procedure 1207 that uses the content sample characterization information to verify that each of the audience members' devices have access to the same (or substantially similar) experiential data stream, to determine characteristics of each remotely recorded experiential data stream so that the local device can evaluate the state of the remote devices, and to determine the alignment of recorded experiential data streams (for example, because each recorded version of the experiential data stream may start at different points, this procedure locates some point in the experiential data stream where each of the remote devices have a recorded I-Frame of substantially the same portion of the experiential data stream).

Once alignment of the I-Frames/GOPs is complete, a 'determine start GOP' procedure 1209 determines the start GOP for the local device. A 'determine synchronization GOP' procedure 1211 determines the expected synchronization GOP and sets the playback vector so that once playback of the experiential data stream starts, the local playback vector will be aligned with the playback vector in the other remote devices when the synchronization GOP is reached. The first startup phase thread 1200 completes through an end terminal 1213.

In some embodiments, the first startup phase thread 1200 also determines how long it will take for the playback position to move from the start GOP to the synchronization GOP. One embodiment negotiates a point in real-time when all the audience members' devices should be presenting the synchronization GOP. Each of the audience members' devices then start presenting the experiential data stream at a real-time such that the playback position for each device arrives at the synchronization GOP at substantially the same point in real-time.

Other embodiments include determining a virtual audience member and then providing appropriate playback vector adjustments so that by the time the synchronization GOP is reached, each audience member is aligned. This can be accomplished by using techniques similar to those described with respect to a 'synchronization command' procedure 1413 as subsequently described with respect to FIG. 14.

Figure 13:
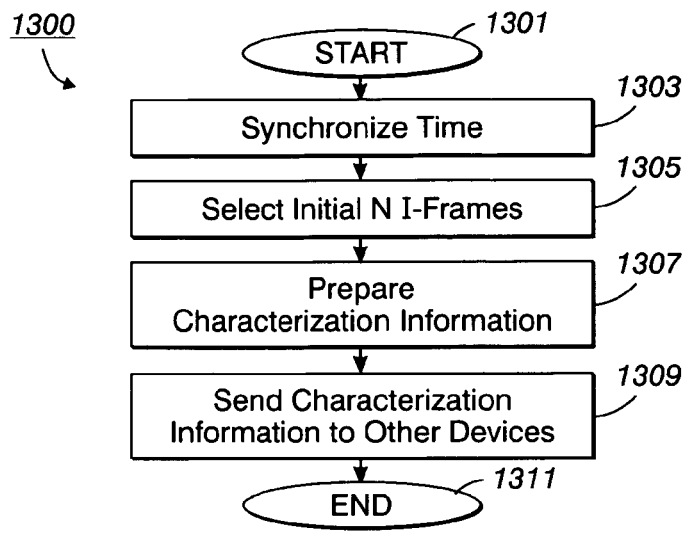
FIG. 13 illustrates a second startup phase thread that can be used in an embodiment.

FIG. 13 illustrates the second phase startup thread 1300 that can be invoked by the 'start threads for phase 1 and 2 startup' procedure 803 of FIG. 8, initiates at a start terminal 1301 and continues to a 'synchronize time' procedure 1303. The 'synchronize time' procedure 1303 can determine the clock of each audience members' devices and can determine the difference between the clocks of each audience members' devices. An additional function of the 'synchronize time' procedure 1303 can be to determine communication latency between the audience members' devices.

A 'select initial N I-frames' procedure 1305 selects N content samples (such as I-frames in this MPEG-2 example) for characterization. N is selected such that I-frames from some recorded portion of the experiential data stream will be characterized (for example, I-frames from 1-10 minutes of the start of the experiential data stream). The recorded portion can be from a complete or partially recorded experiential data stream received by transmission as well as an experiential data stream recorded on a tangible computer-usable data carrier (such as a DVD). The characterization information represents the recorded portion and can be used to determine the start GOP and synchronization GOP for the local audience member's device. The synchronization GOP can be near the first GOP that all the audience members' devices have recorded. Once the collection of I-frames is gathered, a 'pre-pare characterization information' procedure 1307 evaluates the information in the I-frames/GOPs, or other content samples, to uniquely identify the frames as was previously described. Once these I-frames/GOPs are characterized, the 'send characterization information' procedure 1309 sends the characterization information to the audience members' devices and the second phase startup thread 1300 completes through an end terminal 1311. The characterization information represents the content sample such that by analyzing the characterization information from content samples substantially similar content samples from different experiential data streams can be identified.

An additional technology that can be used to align the start of the experiential data stream is enabled if appropriate content meta-data is included within the experiential data stream. Such content meta-data can include identification of the codec used to process the experiential data stream and/or its parameters, the identification of an advertisement portion the experiential data stream, an identification of parental rating for particular segments of the experiential data stream. This content meta-data can simplify the replacement of particular subject matter that has been recorded by the replacement/additional content that can be obtained from the optional content provider service 419, the optional program insertion provider service 433, the storage component 409 or from a computer readable data carrier a accessible to, for example, the first video playback device 403. One skilled in the art will understand that the replacement/additional content can also be associated with the experiential data stream using techniques that can identify a GOP or playback position in the experiential data stream.

In addition, the techniques disclosed by FIG. 12 and FIG. 13 with their associated text can also be applied to align a non-audience member who desired to join the shared social space after the audience members have started to experience the experiential data stream. In this situation, the non-audience member's device would establish its state-exchange threads and obtain state from the audience members. In the situation where the non-audience member's experiential data stream is recorded from the beginning, the device can determine its synchronization GOP from information available from the audience members' devices (making the formerly non-audience member now part of the shared social space), and then perform a synchronization operation with one of the other audience members.

In some situations, the non-audience member will only have a partially recorded experiential data stream that may be missing the initial GOPs that would include the synchronization GOP. In that circumstance, the non-audience member's device would record over some period to establish a sufficient accumulation of GOPs, and then request the audience members' devices to characterize the GOPs near their current playback positions. The non-audience member's device also characterizes its recorded GOPs and determines from the characterization information a synchronization GOP. At this point the formerly non-audience member becomes part of the shared social space and can synchronize with another audience member.

Figure 14:
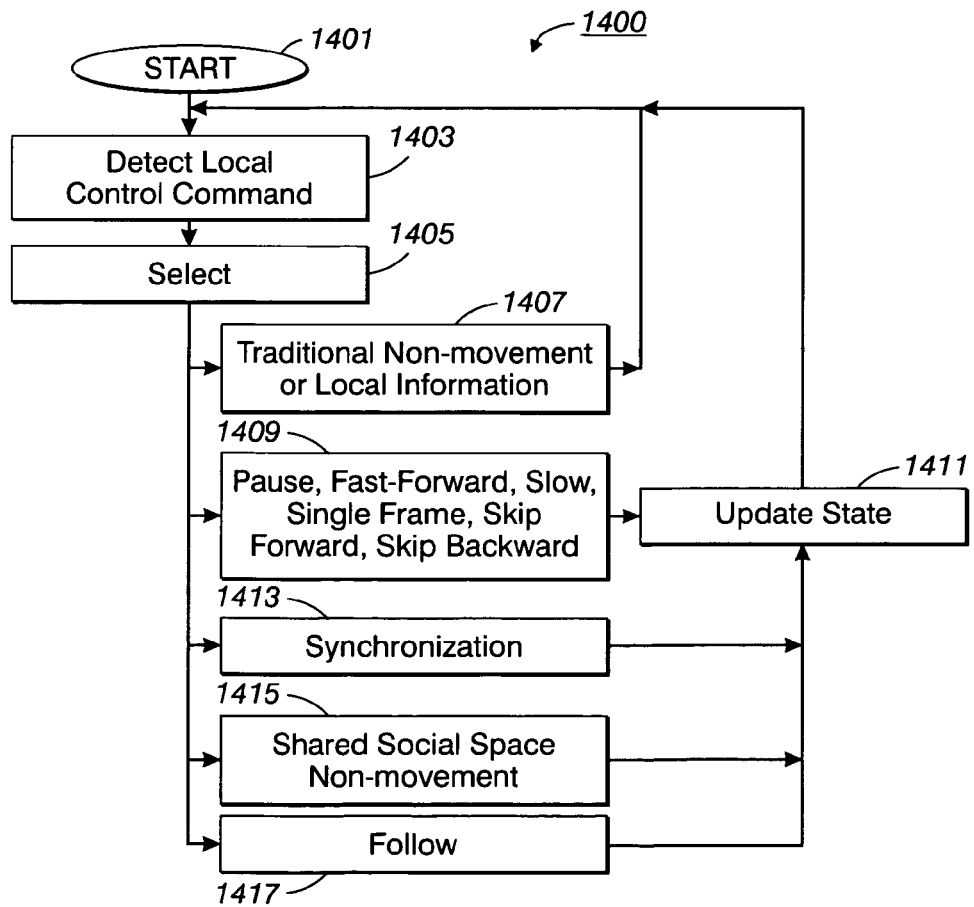
FIG. 14 illustrates an internal control thread process that can be used in an embodiment.

FIG. 14 illustrates an internal control handler thread 1400 that can be used to process the local audience member's command requests. The internal control handler thread 1400 can be invoked by the 'start control thread' procedure 707 of FIG. 7 and initiates at a start terminal 1401. A 'detect local control command' procedure 1403 detects a command request from the local audience member. Once the command request is detected, it can be dispatched by a 'select' procedure 1405 to the appropriate procedure to handle the command request and to cause the device to perform the operation and/or function associated with the command request.

If the command request is not a movement or a shared social space related command (for example, show status, show program information et cetera) the internal control handler thread 1400 continues to a 'traditional non-movement or local information command' procedure 1407 that performs well known operations such as displaying local channel and/or program information. Once the 'traditional non-movement or local information command' procedure 1407 completes, the internal control handler thread 1400 returns to the 'detect local control command' procedure 1403.

If the command request is a movement related command, the internal control handler thread 1400 continues to a 'standard movement command' procedure 1409 that is subsequently described. Once the 'standard movement command' procedure 1409 completes, the internal control handler thread 1400 continues to an 'update state' procedure 1411 that updates the local state of the device and can cause the local state to be sent to the remote devices. The internal control handler thread 1400 continues to the 'detect local control command' procedure 1403.

If the command request is a synchronization related command, the 'synchronization command' procedure 1413 is invoked to perform a synchronization operation. This procedure is subsequently described.

If the command request is a non-movement command related to the shared social space, the internal control handler thread 1400 continues to a 'shared social space non-movement command' procedure 1415 that is subsequently described.

If the command request is a "follow" related command, a 'follow command' procedure 1417, subsequently described, can be invoked.

After the 'standard movement command' procedure 1409, the 'synchronization command' procedure 1413, the 'shared social space non-movement command' procedure 1415, and the 'follow command' procedure 1417, the internal control handler thread 1400 continues to the 'update state' procedure 1411 previously described.

The 'standard movement command' procedure 1409 breaks any existing follow state and performs the requested command. These commands can include a pause command, a fast forward command, a shuttle command, a single frame movement command, a timed skip command, a backward command, and a rewind command as well as other well known commands. The 'standard movement command' procedure 1409 can also update the state of the local device to reflect the result of the command.

Another aspect of the 'standard movement command' procedure 1409 is that of detecting when a command by a local audience member would be expected to reduce the cohesion of the shared social space 523 and to inform the audience member of this consequence. In some embodiments, the consequence may be to remove the audience member from the shared social space.

Figure 15:
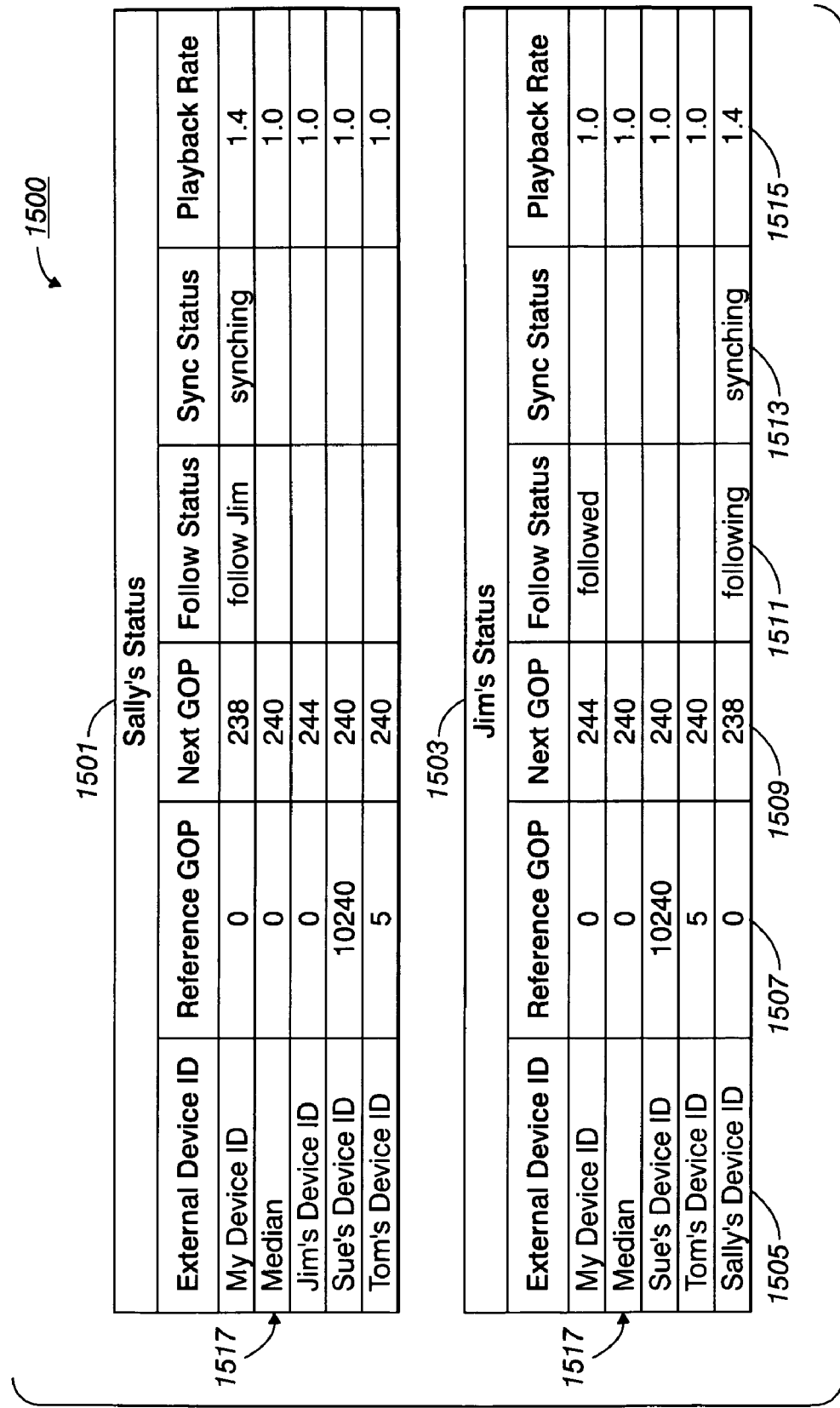
FIG. 15 illustrates a partial representation of state information maintained in one embodiment.

The 'update state' procedure 1411 can record the change in local state resulting from the 'standard movement command' procedure 1409, the 'synchronization command' procedure 1413, the 'shared social space non-movement command' procedure 1415 and the 'follow command' procedure 1417. In one embodiment, the state of the local device can be kept with the state of the remote devices such as is shown in FIG. 15. The 'update state' procedure 1411 can also trigger continuation of the state exchange-output thread 900 to transmit the changed state over the control link to the remote devices (either directly or through a server).

The 'synchronization command' procedure 1413 can provide an option for the local audience member to condition the local device to synchronize with audience members in the shared social space. For example, the local audience member can select that the local device synchronize with a specific remote audience member's device, the remote audience member whose playback position is closest to the Median playback position of all the audience members in the shared social space; or can select that the local device synchronize to the Median playback position of all the audience members (or any other virtual playback position value that can be periodically computed from the playback position of the audience members). Once the local device's playback position is aligned with the playback position of the specified device, the local device can be conditioned to track the playback position of that specified device (for example by using a follow command).

There are many ways of synchronizing a local audience member with a remote audience member. Some of these ways include a context-displayed synchronization, a jump synchronization, and a social-context synchronization.

When determining the Median or Mean playback position, outlying audience members or audience members who are in the process of performing a movement command (including pause) can be excluded from that determination.

A local audience member's device can stop tracking a remote audience member's device by the local audience member invoking a movement command such as pause, fast forward, rewind, et cetera. The local audience member can invoke a synchronization command to again align the local audience member's playback position with that of the remote audience member. Once aligned, the playback positions can move out of alignment by either viewer invoking a movement command. If the local device is tracking the remote device, the local device will perform the same operation as the remote device (for example pausing when the remote device is paused et cetera). Some embodiments automatically enable tracking after synchronization. Other embodiments require an explicit command request to enable tracking.

Some embodiments allow that the shared social space have a master audience member to which all other audience members track. One embodiment of the synchronization algorithms are subsequently described with respect to FIG. 16.

The 'shared social space non-movement command' procedure 1415 allows the local audience member to enter command requests for operations that are related to the shared social space but that do not affect movement or control the playback position. One example of such an operation can result from the exit/enter group command used to exit or enter the shared social space. In one embodiment, this operation allows a local audience member to exit the shared social space (for example, to cause the local audience member's device to stop distributing state information to other devices). In another embodiment, this operation allows the local audience member to join a shared social space such as by terminating selected threads and restarting the terminated threads targeted to a different shared social space with possibly a different experiential data stream. Still another example is an operation that presents the status of the shared social space to the local audience member.

The 'follow command' procedure 1417 can toggle (or set) the "follow state" (that controls the tracking operation). In addition, this command request can specify which remote audience member's device to follow. If no specific remote device is specified, the local device can automatically select one of the remote devices (by, for example, determining the median or mean of the locations of some or all of the audience members within the experiential data stream and synchronizing to a remote audience member near that location; or specifying a virtual audience member location to synchronize with). The "follow state" controls whether the local audience member's device tracks the remote audience member's device.

FIG. 15 illustrates a partial state representation 1500 that includes the partial state of two of four audience members in the shared social space. In particular, FIG. 15 illustrates a state for Sally 1501 and a state for Jim 1503 each as seen from the local device for Sally and Jim respectively. One skilled in the art would understand that Sue's and Tom's devices would have similar state information. Such a one will also understand that additional state information may be kept for each device in addition to the state shown herein. In some embodiments, a status display (not shown) of a representation of one or more of the audience members' state information can be presented to any of the audience members in response to a user command request, a change of state, in response to an event et cetera. Thus, by receiving state information from a remote audience member's device, the local audience member's device can monitor the remote audience member's device. In particular, the local audience member's device can monitor the remote audience member's device's playback position.

A 'device identification' field 1505 provides information about the audience members and their devices. The information in this field (although here represented by an audience member's name and the text "Device ID") generally includes the address of the device associated with the audience member, and some human-readable text to identify the audience member (for example, a nickname, name, handle, login, et cetera).

A 'reference GOP' field 1507 indicates the identification of the starting GOP for the experiential data stream. The contents of this field can be determined by the 'determine start GOP' procedure 1209 of FIG. 12. A 'next GOP' field 1509 contains a value that indicates the GOP of the next GOP (based off of the Reference GOP) that is expected to be viewed.

A 'follow state' field 1511 contains state indicators such as "followed" that indicate that the device of some other audience member is tracking your local device; "following" that indicates that audience member is tracking some other audience member; "follow X" that indicates that the local device is tracking X's device. One possible consequence of being "followed" is that the speed of a rewind or fast forward operation may be adjusted to better allow the audience member(s) that are following to efficiently align the playback positions.

Figure 16:
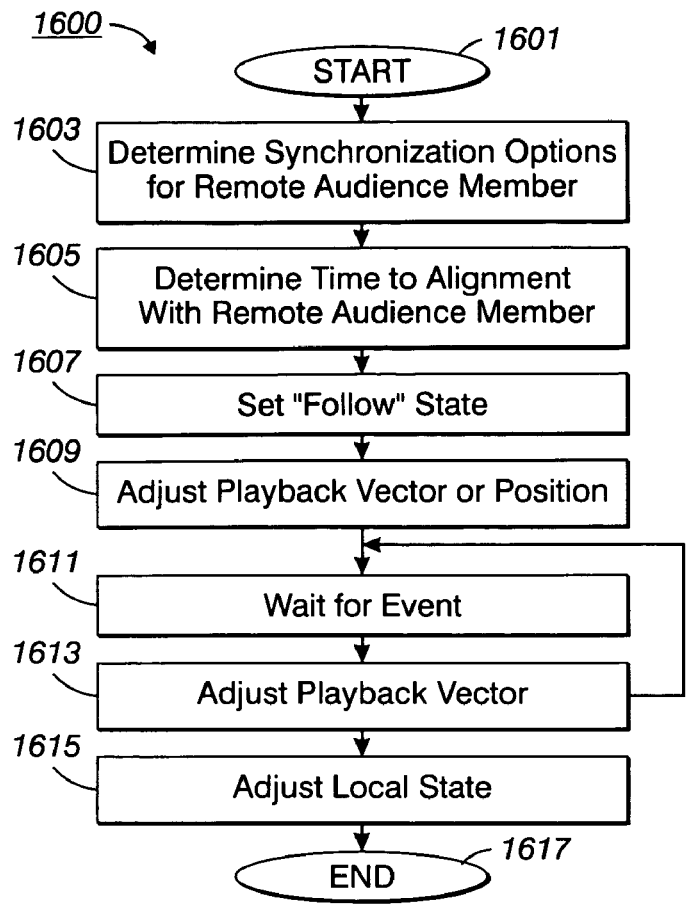
FIG. 16 illustrates a synchronize with remote audience member process.

A 'synchronization state' field 1513 can be used to indicate the synchronization state of a local or remote device (including the type of synchronization, see the subsequent discussion related to FIG. 16). A 'playback rate' field 1515 can be used to indicate the playback rate of a device.

A 'median virtual member' record 1517 can be used to indicate the current playback position in the experiential data stream that would be the middle (median, mean or other calculated value) of the shared social space. The value in this field can be periodically updated based on the values of the other entries in the 'next GOP' field 1509. In some embodiments, audience members who are sufficiently far from the calculated value may be dropped and the value recalculated.

FIG. 16 illustrates a synchronize with remote audience member process 1600 that can be used in an embodiment of the social television system 400. Some of the synchronization modes can include a context-displayed synchronization, a jump synchronization, and a social-context synchronization. The modes can be specified by the local audience member using any interface to the local audience member's device.

The synchronize with remote audience member process 1600 can be initiated by the 'synchronization command' procedure 1413 responsive to a local audience member command request or, if invoked by other procedures, as needed. The synchronize with remote audience member process 1600 starts at a start terminal 1601 and continues to a 'determine synchronization options for remote audience member' procedure 1603 that determines whether the synchronization command request is for a context-displayed synchronization, whether the synchronization is for a jump synchronization, whether the synchronization is for a social-context synchronization, or for some other type of synchronization. A 'determine time to alignment with remote audience member' procedure 1605 determines the amount of real-time to take to align the local audience member's playback position with the targeted (real or virtual) remote audience member's playback position. The 'determine time to alignment with remote audience member' procedure 1605 can be responsive to the synchronization mode.

If the synchronization option is for a jump synchronization, the local audience member will be synchronized as quickly as possible with the remote audience member by effectively setting the local audience member's playback position to be that of the remote audience member's expected playback position at the completion of the jump synchronization as adjusted by the expected time required to perform the synchronization and accounting for communication latency. This synchronization mode can result in a loss of context of both the experiential data stream and the commentary audio clips within the shared social space because a portion of the experiential data stream can be skipped and any recorded commentary audio clip from a remote audience member associated with the skipped portion will not be presented.

If the synchronization option is for a context-displayed synchronization, the 'determine time to alignment with remote audience member' procedure 1605 can be invoked and can determine from the partial state representation 1500 the respective playback positions of the remote and local audience members, determine the delta time between the playback positions, select a synchronization interval, and determine the adjustment to the local audience member's playback vector (and/or in some embodiments to the remote audience member's playback vector). A context-displayed synchronization mode adjusts the local audience member's playback vector from the nominal playback vector (faster or slower) such that, over some synchronization interval, the local audience member's and the remote audience member's playback position become aligned (after which time the local audience member's playback vector can be set equal to the remote audience member's playback vector, or returned to its nominal value). The adjusted playback vector can be determined from a viewing distance (the separation in the playback positions) and selection of a suitable synchronization interval within which to achieve alignment of the devices. The synchronization interval can be generally selected such that the local audience member can comprehend the portion of the experiential data stream that is being presented using the adjusted playback vector. The synchronization interval can be heuristically determined and represented as a function of the viewing distance and the playback vector of the remote audience member's device. The audio (both the audio from the experiential data stream or replacement/additional content, as well as any transitory audio or commentary audio clip) associated with the portion of the experiential data stream that will be presented at other than nominal speed can be pitch compensated accordingly. Thus, the remote audience member can synchronize with the remote audience member while still being exposed to the context that would be missed by a jump synchronization.

If the synchronization option is for a social-context synchronization, the 'determine time to alignment with remote audience member' procedure 1605 can again determine from the partial state representation 1500 the respective playback positions of the remote and local audience members, and determine the local audience member's playback vector value so that the playback position of the local audience member and the remote audience member will become aligned after some unspecified interval. A social-context synchronization is one that uses a faster playback vector (in some embodiments, resulting in a "fast-forward" playback vector) for advancing the experiential data stream of the local audience member until proximity to the audio trigger position of a commentary audio clip is detected. When this occurs, the local audience member's playback vector can be returned to the nominal vector so that the local audience member can experience the content in the experiential data stream that engendered the pending commentary audio clip. The local audience member's playback vector will remain nominal, and all the commentary audio clips will be reproduced until some period after the commentary audio clips related to that portion of the experiential data stream completes. At this point, the local audience member's playback vector will again be increased to advance the experiential data stream until the next the audio trigger position is approached, the local audience member cancels the synchronization, or the local audience member's playback position aligns with the remote audience member (at which point, the playback vector can be returned to nominal). During the synchronization period, the remote audience member's playback position continues to advance. Thus, this synchronization mode periodically determines the distance between the local audience member's and remote audience member's playback positions and terminates the synchronization when they become aligned the same.

The social-context synchronization differs from the context-displayed synchronization in that in the social-context synchronization the importance of the social communication within the shared social space is given priority over the speed of synchronization whereas in the context-displayed synchronization the playback vector is simply increased (for both the experiential data stream or replacement/additional content, and the commentary audio clips) and thus the local audience member will not fully experience the context of the experiential data stream with the commentary audio clips.

The processes used by either of the social-context synchronization or the context-displayed synchronization can also be used by a local audience member who is not a member of the shared social space. Thus, if commentary audio clip group is purchased or has already been recorded from audience members in a previous shared social space, the local audience member can playback of the experiential data stream with the associated commentary audio clips. The local audience member can fast forward through the experiential data stream using one of the disclosed synchronization modes to experience the experiential data stream and its commentary audio clips. In this situation, the local audience member's device has no need to maintain state from a remote audience member's device, or to achieve alignment.

Each of the synchronization modes stores a different state in the 'synchronization state' field 1513.

A 'set follow state' procedure 1607 can set the 'follow state' field 1511 and the 'playback rate' field 1515 for the local audience member to indicate which real or virtual remote audience member is to be (or is currently) tracked, and if the synchronization mode is a context-displayed synchronization, will set the 'synchronization state' field 1513 and the 'playback rate' field 1515 to the appropriate values. This change in state will be propagated to at least the device associated with remote audience member. Once the synchronization mode is determined and the local state adjusted, an 'adjust playback vector or position' procedure 1609 then starts the synchronization process in accordance with the previously described synchronization modes. The state for the local audience member's device can be updated accordingly.

Next, a 'wait for event' procedure 1611 waits for a condition such as when the playback position of the local audience member and the followed remote audience member become aligned. One skilled in the art would understand that there are many different ways to determine the occurrence of this event (including polling, occurrence of a hardware-generated event, et cetera). Once the playback position of the followed remote audience member and local audience member are aligned an 'adjust playback vector' procedure 1613 adjusts the payback vector (if required) to match that of the followed remote audience member. An 'adjust local state' procedure 1615 adjusts the local state such as by resetting the 'synchronization state' field 1513, the 'playback rate' field 1515 if need be, and possibly the tracking state. The synchronize with remote audience member process 1600 completes through an end terminal 1617.

The 'wait for event' procedure 1611 can also detect the audio trigger position of an upcoming commentary audio clip from a remote audience member or purchased commentary audio clip for the experiential data stream such that the 'adjust playback vector' procedure 1613 can return the playback vector to nominal to effect the social-context synchronization mode. Then, the synchronize with remote audience member process 1600 returns to the 'wait for event' procedure 1611 to wait for the completion of the presentation of the commentary audio clip. Once the commentary audio clip is presented, an event can be triggered and detected such that the 'adjust playback vector' procedure 1613 can resume the synchronization that was interrupted by detection of the audio trigger position of the commentary audio clip.

Further, the 'wait for event' procedure 1611 can wait for other events that result from the local audience member invoking a command request that cancels the synchronization or is inconsistent with the synchronization.

In addition to the jump synchronization, the context-displayed synchronization, and the social-context synchronization, the inventors have developed a wait-for synchronization that can be used to pause or slow down playback until a remote audience member's playback position catches up to the local audience member's playback position.

The local audience member can interact with the local device using any method possible including a controller, a computer, a web page, Bluetooth™, Obje™ technology et cetera multiple button push, menu selection, infrared devices, and the like. In addition, eye-tracking technology can be used from the images obtained from the video camera 435. Further presence information as to who belongs to the local audience members can be sent to the remote audience members from the video camera 435 through any of the possible communication paths established by the social television system 400.

Figure 17:
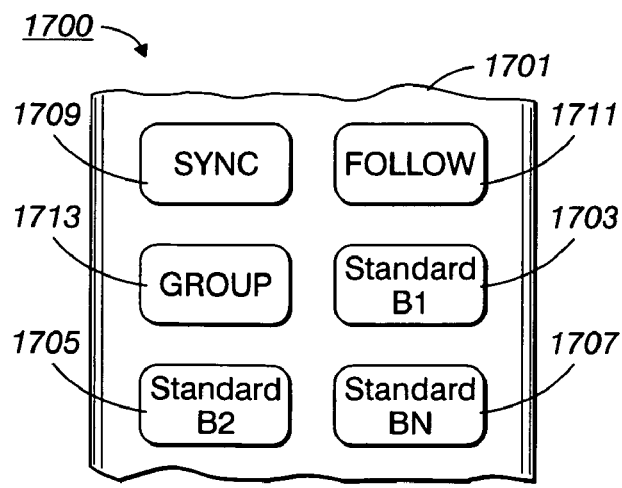
FIG. 17 illustrates a control panel that can be used to activate one or more features enabled by an embodiment.

FIG. 17 illustrates a control panel 1700 that can be used by a local audience member to control their participation in the shared social space or to control other aspects of the disclosed technology whether or not applied to the shared social space. The control panel 1700 can be incorporated with the first video playback device 403 and/or the control device 441. The control panel 1700 interacts with the local audience member's playback device to cause the playback device to perform enabled functions (for example, by issuing command requests to the playback device, or by conditioning electronics or other circuitry or procedures within the playback device). These command requests can be issued by, for example, using buttons on the control panel 1700 for the first video playback device 403, using a separate control device (similar to a DVD or DVR remote control), can be implemented using a general device or computer that can be programmed to interact with the local audience member's device through numerous mechanisms such as the Internet, Infrared protocols, Bluetooth™ protocols, Obje™ protocols, and any technology for providing communications between a remote control device and the device the remote is to control (including web interfaces).

One embodiment of the control panel 1700 comprises a housing 1701 containing, for example, a power supply, control circuitry, communication circuitry et cetera (all not shown), and structured to support user selectable controls (USC) such as a first standard USC 1703 that could be a power button, a second standard USC 1705 that could be a number button, an Nth standard USC 1707 that could be any USC that would commonly be on a remote control device for an entertainment system or otherwise. A 'synchronize' USC 1709 can be one mechanism that, when activated, issues a command for initiating the synchronization process and/or the tracking process that is described herein and for which one embodiment has been described, for example, with respect to FIG. 16. The 'synchronize' USC 1709 can also be used to replay the experiential data stream and associated commentary audio clips on the audience member's device using, for example, a context-displayed synchronization or a social-context synchronization (even if the audience member is not sharing the shared social space with a remote audience member). A 'follow' USC 1711 can be one mechanism that, when activated, issues a command for initiating the follow process that enables tracking of a remote audience member's playback position that was previously described and for which one embodiment has been described with respect to FIG. 6. A 'group' USC 1713 can be one mechanism, when activated, for issuing a command for initiating, entering or exiting the shared social space and can be used to initiate the 'join guests' procedure 603 previously discussed with respect to FIG. 6.

User selectable controls that invoke commands that can invoke the 'update state' procedure 1411 when in a shared social space, are termed social-space related user selectable controls. Some of the social-space related user selectable controls also control capabilities disclosed herein that can operate outside of the shared social space.

In addition, USCs or control options can be used that allow the local audience member to switch to nominal speed playback while in a synchronization mode. This can be accomplished by a command issued by a cancel synchronization USC, or by the user activating the 'synchronize' USC 1709 to issue a synchronization command when the device is already in a synchronization state. In addition, the inventors contemplate command options that allow the local audience member to condition the synchronization modes (or an increased playback mode, fast forward) such that as the audio trigger position of a commentary audio clip is approached, the speed of presentation of the experiential data stream would be automatically changed to nominal speed so that the commentary audio clip can be presented with the supporting portion of the experiential data stream. Once the commentary audio clip is complete, presentation of the experiential data stream could then automatically revert to the previous playback speed, or automatically re-invoke the synchronize with remote audience member process 1600 to continue the synchronization process from the current state. One skilled in the art will understand that commands issued responsive to some of the standard USCs may affect other audience members. For example, if a followed audience member pauses or fast forwards his/her local device, the following audience members' local devices will do the same. Further some local commands over some period of time may reduce the cohesion of the shared social space and the audience members can be removed from the shared social space.

Another aspect of a social television system is that of coordinating transitory audio (and possibly video) from remote audience members with the audio from the experiential data stream. The problem is that for many types of experiential data streams (for example, types of television program) comments from the audience members need to be presented at non-disruptive positions in the experiential data stream. Otherwise, other audience members can be annoyingly distracted from the experiential data stream (note that this is not an issue with silent video of the remote audience member whether this video is presented as Picture in Picture (PIP) or on a separate device). One skilled in the art will understand that there are additional issues that result from the possibility of some of the audience members having playback positions significantly out of alignment with the other audience members.

Commentary audio clips from remote audience members having playback positions sufficiently out of alignment may not be presented to the local audience member (however, the transitory audio can still be recorded as a commentary audio clip for the local audience member and indexed to the audio trigger position—that is, the playback position of the remote audience member's device at the time of the utterance). In the circumstance where the remote audience member is in advance of the local audience member, the remote audience member's audio can be recorded for presentation when the local audience member reaches the corresponding audio trigger position. If the commentary audio clip is received and indexed to a playback position prior to the local audience member's current playback position, the commentary audio clip will be stored, but will be not be presented unless the local audience member rewinds the experiential data stream or otherwise traverses the portion of the experiential data stream containing the audio trigger position. In addition, the local audience member's device can record all audio at the playback position when the audio was uttered (both locally detected audio as well as audio detected at the remote devices). Thus, a subsequent playback of the experiential data stream optionally can include all the audio from all the audience members' utterances while in the shared social space. Thus, an enhanced recording of the shared social space can be presented to each of the audience members.

Audio from both the local and remote audience members (separately or combined) can be recorded with respect to the playback position of the speaker such that subsequent playback of the experiential data stream will include all or selected commentary audio clips appropriately sequenced to the experiential data stream (this allows a subsequent playback to present commentary audio clips made by others whose playback position when the uttered audio was recorded was behind the playback position of the local audience member during the initial experience of the shared social space). A copy of all or a portion of the commentary audio clip can be separately stored on a tangible computer usable data carrier or transmitted across a network. The local audience member can select whether to separately store only his/her commentary audio clips, all commentary audio clips, or any selection of commentary audio clips selected by audience member and/or portion of the experiential data stream.

There are other embodiments for presenting audio between the audience members. In one embodiment, characterized by each of the audience members who are in a conversation being aligned in the experiential data stream, the audio from each of these audience members can be presented to the other audience members in real-time. This embodiment can also be used with conversation finder technology as is taught in the previously incorporated-by-reference published United States patent applications to support side conversations between some of the local audience members with some of the remote audience members.

In one embodiment subsequently described with respect to FIG. 18, commentary audio clips can be downloaded (or otherwise delivered) to the local audience member's device and associated with the experiential data stream. Thus, a local audience member can have his/her audio stored and indexed to the experiential data stream and can then share his/her commentary audio clips with others. In addition, the commentary audio clips can be provided for sale.

Further, commentary audio clips can be associated with the experiential data stream during the same presentation of the experiential data stream and can be individually conditioned (such as by using controls as described with respect to FIG. 17) to be presented, and for those commentary audio clips that are to be presented having an audio duration that overlaps other commentary audio clips, can be conditioned to be presented in simultaneous, sequential, instant-replay, or other modes.

Each commentary audio clip in a simultaneous presentation mode can be presented in real-time with the experiential data stream. Thus, multiple commentary audio clips can be simultaneously presented as each is triggered as the playback position approaches an audio trigger position in the experiential data stream.

Each commentary audio clip in a sequential presentation mode can be presented in order (the order can be specified by the local audience member) such that when the playback position reaches the audio trigger position, all simultaneous mode commentary audio clips (if any) and the first ordered sequential commentary audio clip can be presented followed by the second ordered sequential commentary audio clip, then the third et cetera. While the sequential commentary audio clips are being presented, any simultaneous commentary audio clip can be also presented at the audio trigger position. This allows sequential presentation of commentary audio clips related to a playback position in the experiential data stream. In one embodiment, the length of the combined commentary can be determined, and the playback vector can be adjusted so that some or all of the sequential commentary audio clips are sequentially presented during the same period in the experiential data stream time dimension as the time period to required to present the longest sequential commentary audio clip alone using the nominal playback vector.

For commentary audio clip having an instant-replay presentation mode, the first ordered instant-replay commentary audio clip can be presented along with any commentary audio clips in simultaneous presentation mode while the experiential data stream can be presented at nominal speed. After the first ordered instant replay commentary audio clip is presented, the experiential data stream can be re-wound to the playback position of the first instant-replay commentary audio clip and the second ordered instant replay commentary audio clip can be presented (but not the first) as well as optionally replaying the simultaneous commentary audio clip.

In some embodiments, audio from each of the audience members can be processed to recognize whether the audio contains non-verbal vocal utterances such as laughter, sobbing, groaning, et cetera. This audio can be merged to make a commentary audio clip group containing these utterances from the audience members in the shared social space, thus, creating a commentary audio clip group that is equivalent to a private laugh-track with utterances recorded from audience members participating in the shared social space. The commentary audio clip can be processed to detect non-verbal vocal utterances and classified accordingly (for example when the commentary audio clip is created or when the commentary audio clip is indexed to the experiential data stream).

One skilled in the art will understand that the local audience member can specify options as to which of the commentary audio clips (based on audience member identification) is to be presented and can selectively disable commentary audio clips as desired.

Figure 18:
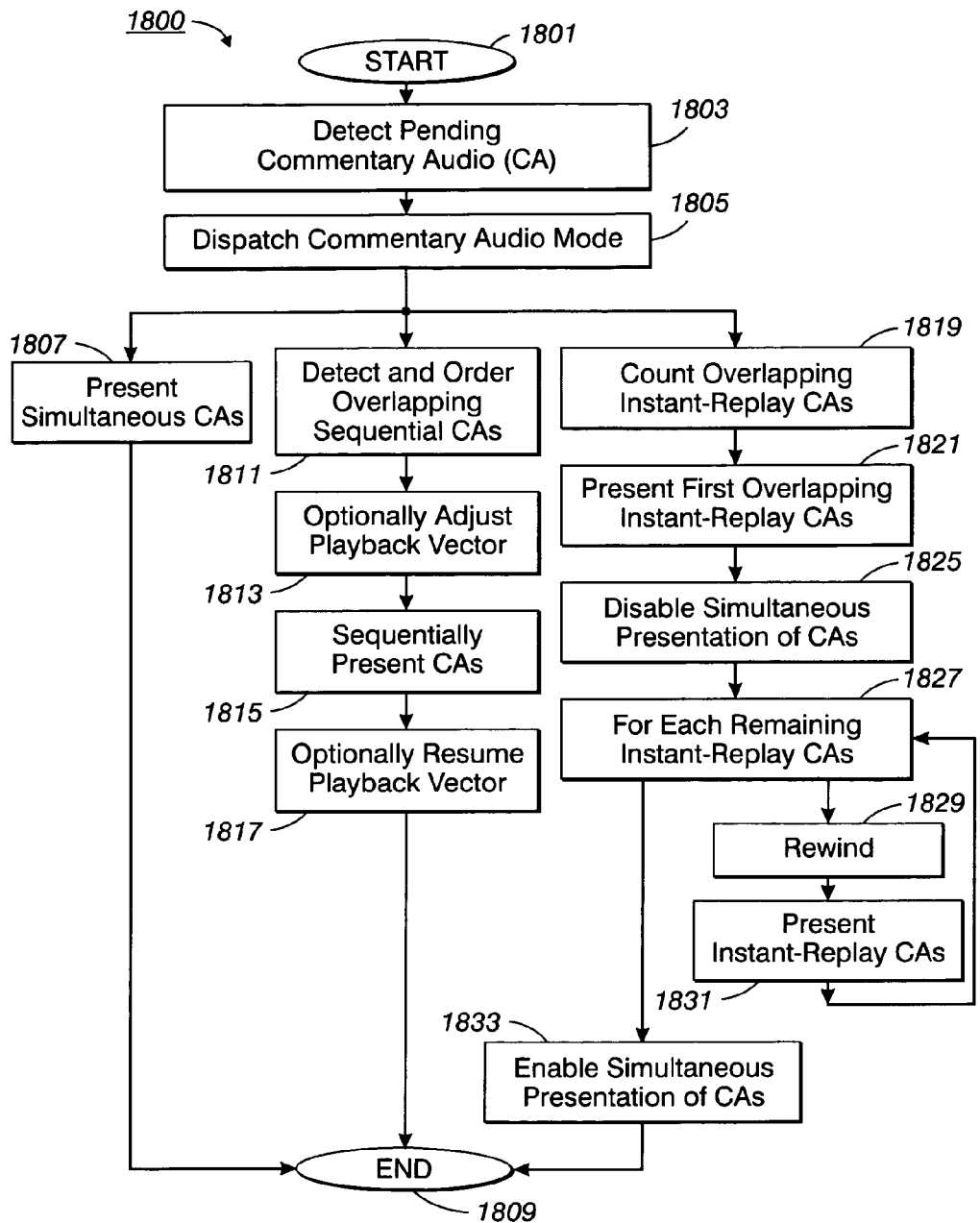
FIG. 18 illustrates a commentary audio clip presentation process.

FIG. 18 illustrates a commentary audio clip presentation process 1800 that initiates at a start terminal 1801 responsive, for example but without limitation, to a timer, other event, or a periodic thread. Once initiated, the commentary audio clip presentation process 1800 continues to a 'detect pending commentary audio clip' procedure 1803 that determines the playback position of the experiential data stream and locates upcoming audio trigger position(s) that will trigger imminently pending commentary audio clip. Next, a 'dispatch' procedure 1805 scans the index to the imminently pending commentary audio clip to determine its presentation mode. If the commentary audio clip is in simultaneous mode, the commentary audio clip presentation process 1800 continues to a 'present simultaneous commentary audio clip' procedure 1807 that cues up the commentary audio clip for presentation when the playback position reaches the location specified in the commentary audio clip. Then the commentary audio clip presentation process 1800 completes through an end terminal 1809 (although the process can also repeat until all imminently pending commentary audio clips are handled or by subsequent event postings).

At the 'dispatch' procedure 1805, if the commentary audio clip is in sequential presentation mode, the commentary audio clip presentation process 1800 continues to a 'detect and order overlapping sequential commentary audio clip' procedure 1811 that scans the indices to the imminently pending sequential commentary audio clips to determine whether there is an overlap between the first such commentary audio clip and a subsequent commentary audio clip. If no overlap exists, the commentary audio clip can be processed by the 'present simultaneous commentary audio clip' procedure 1807 (the transfer of such a sequential commentary audio clip to the 'present simultaneous commentary audio clip' procedure 1807 is not shown). If an overlap occurs between two imminently pending sequential commentary audio clips, the 'detect and order overlapping sequential commentary audio clip' procedure 1811 determines the time required to present each of the overlapping sequential commentary audio clips. An 'optional adjust playback vector' procedure 1813 can adjust the playback vector so that the sequential playing (one after another) of all of the overlapping commentary audio clips in real-time will span the same period as the longest of the commentary audio clip in the experiential data stream time (for example, if there are two overlapping commentary audio clips, determining the time required to sequentially play both in non-overlapping fashion, adjusting the playback vector to slow the presentation of the experiential data stream such that both commentary audio clips are presented during the presentation of the slowed experiential data stream). The 'optional adjust playback vector' procedure 1813 and the 'detect and order overlapping sequential commentary audio clip' procedure 1811 coordinate to adjust the playback position for the commentary audio clips such that a subsequent commentary audio clip starts following the completion of the previously presented commentary audio clip. The 'optional adjust playback vector' procedure 1813 is optional in that it allows sequential commentary audio clips to be presented while still presenting the corresponding content from the experiential data stream (although in a slow speed fashion). Alternatively, the playback vector need not be adjusted so long as the overlapping commentary audio clips are serialized.

A 'sequentially present commentary audio clips' procedure 1815 then presents the commentary audio clips (one skilled in the art will understand that the presentation of the commentary audio clips can accomplished in a plethora of ways). Once the commentary audio clips are presented, an 'optional resume playback vector' procedure 1817 restores the playback vector to the nominal speed of the experiential data stream if required and the commentary audio clip presentation process 1800 completes via the end terminal 1809.

Commentary audio clips conditioned to be presented in simultaneous mode can also be presented during the period that sequential commentary audio clips are being presented.

At the 'dispatch' procedure 1805, if the commentary audio clip is to be presented in instant-replay presentation mode, the commentary audio clip presentation process 1800 continues to a 'count overlapping instant-replay commentary audio clips' procedure 1819 that scans the imminently pending indices to commentary audio clips to determine whether there is an overlap between the first such instant-replay commentary audio clip and a subsequent commentary audio clip. If no overlap exists, the commentary audio clip can be processed by the 'present simultaneous commentary audio clip' procedure 1807 (the transfer of such a sequential commentary audio clip to the 'present simultaneous commentary audio clip' procedure 1807 is not shown). If an overlap occurs between two imminently pending instant-replay commentary audio clips, the 'count overlapping instant-replay commentary audio clips' procedure 1819 counts the number of such overlaps and can store the playback position of the first occurring commentary audio clip and the playback position corresponding to the end of the last commentary audio clip. A 'present first overlapping commentary audio clip' procedure 1821 then causes the first in time commentary audio clip to be presented. During the presentation of this instant-replay commentary audio clip simultaneous commentary audio clips are also presented. In one embodiment, the experiential data stream can be presented until the playback position corresponding to the end of the last instant-replay commentary audio clip is reached. This allows all the simultaneous commentary audio clips to be presented during the first iteration of the instant-replay period (in other embodiments the simultaneous commentary audio clips can be presented on each iteration, or each iteration can terminate at the end of the presently presented commentary audio clip with or without presentation of the simultaneous commentary audio clips).

For the embodiments that do not allow simultaneous commentary audio clips to be presented on subsequent iterations, a 'disable simultaneous presentation of commentary audio clip' procedure 1825 disables the capability. A 'for each remaining instant-replay commentary audio clip' iterative procedure 1827 then iterates each instant-replay commentary audio clip to a 'rewind' procedure 1829 that rewinds the experiential data stream to (depending on the embodiment) the saved playback position (so that each instant-replay iteration starts at the same location), or rewinds back to before the playback position of the next iteration. A 'present instant-replay commentary audio clip' procedure 1831 that operates substantially the same as the 'present first overlapping commentary audio clip' procedure 1821 then presents the iterated instant-replay commentary audio clip and the commentary audio clip presentation process 1800 returns to the 'for each remaining instant-replay commentary audio clip' iterative procedure 1827 to continue iteration of the instant-replay commentary audio clips.

When all the instant-replay commentary audio clips have been iterated, the commentary audio clip presentation process 1800 continues to an 'enable simultaneous presentation of commentary audio clip' procedure 1833 that re-enables presentation of simultaneous commentary audio clips if it was disabled by the 'disable simultaneous presentation of commentary audio clip' procedure 1825 and the commentary audio clip presentation process 1800 completes through the end terminal 1809.

In yet another embodiment, when an audio is received from another audience member the receiving system can determine the best place to insert the audio into the experiential data stream instead of inserting the audio at the playback position corresponding to where the commentary audio clip or transitory audio was uttered.

Figure 19:
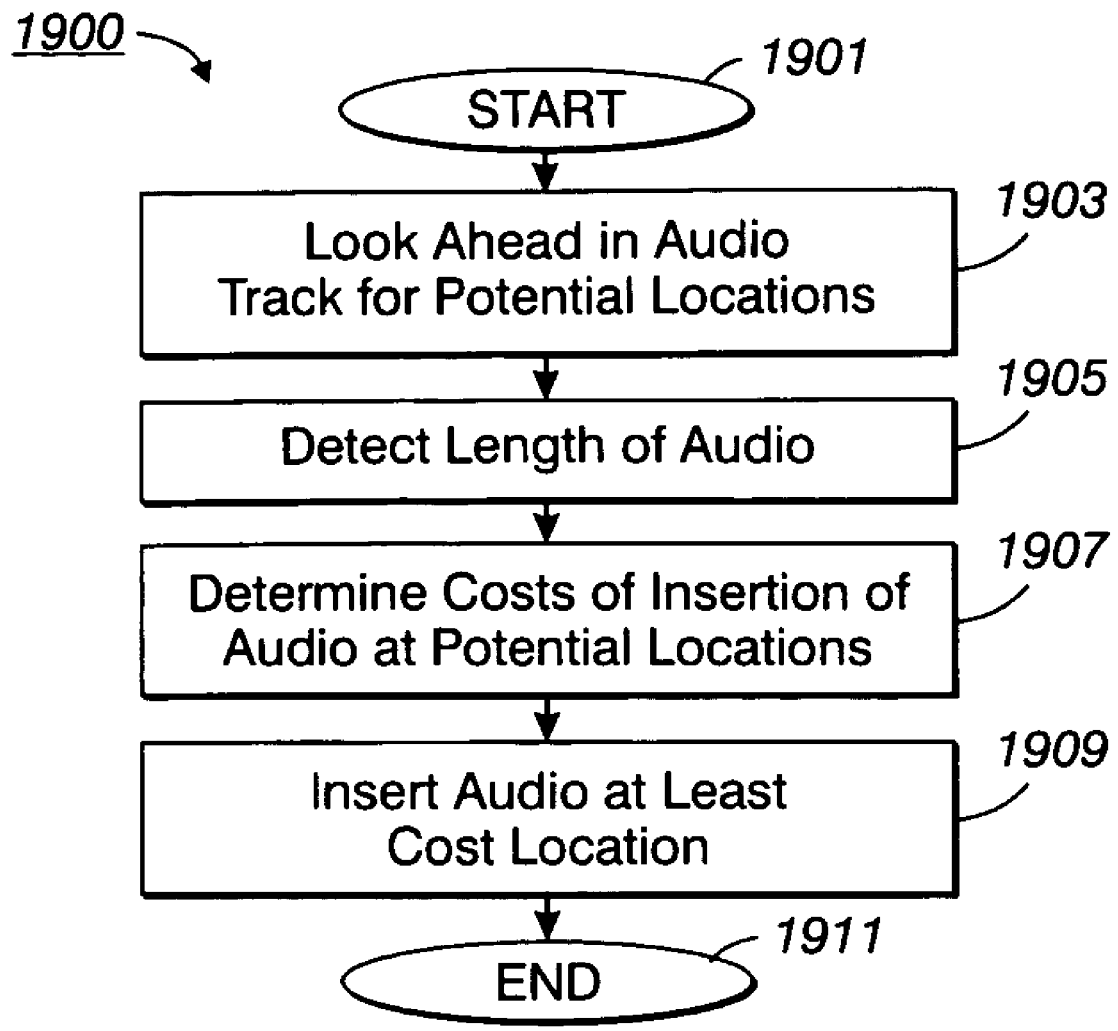
FIG. 19 illustrates a process for associating audience member utterances with the experiential data stream.

FIG. 19 illustrates an audio insertion process 1900 that can be used to determine where in the experiential data stream to insert transitory audio received from a remote audience member or local audience member. The audio insertion process 1900 can be used alone or in conjunction with other audio processing disclosed herein. The audio insertion process 1900 can be part of an event process or can be invoked through a receive audio thread (not shown) that receives and assembles the transitory audio stream from the remote audience member (or captures and digitizes the transitory audio from an utterance of a local audience member). The audio insertion process 1900 initiates at a start terminal 1901 and continues to a 'look-ahead' procedure 1903.

The 'look-ahead' procedure 1903 analyzes a later portion of the experiential data stream that is ahead of the local playback position in the time dimension to find candidate portions of the experiential data stream that may be suitable for placement of the received transitory audio. Examples of such portions include quiet areas, areas containing commercials, or portions of the experiential data stream that have heuristically determined characteristics.

A 'detect audio length' procedure 1905 determines the duration characterization of the transitory audio or expected duration characterization (for example, by looking at the history of audio from that remote audience member). The 'detect audio length' procedure 1905 can also determine other characterizations of the transitory audio stream (such as loudness, type of utterance, et cetera) and can store the transitory audio (such that it can be converted into a commentary audio clip that has an audio trigger position associated with the experiential data stream).

A 'determine cost of insertion' procedure 1907 then computes a minimum cost for each candidate portion that includes a charge for delaying the transitory audio from the playback position where it was uttered, a charge for compressing the duration of the transitory audio, a charge for having overlap between the transitory audio and significant audio from the experiential data stream, and, in some embodiments, charges for overlapping transitory audio from two of the remote audience members, having transitory audio from multiple remote audience members presented out of order, or having similar conflicts with commentary audio clip.

One result of the 'determine cost of insertion' procedure 1907 can be to determine an audio trigger position in the experiential data stream where the commentary audio clip version of the transitory audio is to be presented to the local audience member. Next an 'insert audio' procedure 1909 stores the transitory audio as a commentary audio clip (if not already stored) indexed to the experiential data stream by an audio trigger position. The audio insertion process 1900 then completes through an end terminal 1911.

Another aspect of the herein disclosed technology is the business of providing commentary audio clips and replacement/additional content to an audience member. One such business offers commentary audio clips for sale to an audience member who then purchases the commentary audio clip. The commentary audio clips can be delivered over the network (a computer usable data carrier), on tangible computer usable data carrier, or via other techniques known in the art. Another such business provides replacement and/or additional advertisements for use when presenting the experiential data stream. The advertisers would pay for the number of placements or will pay using any negotiated metric known in the art. Another such business provides replacement content for portions of the experiential data stream to allow selected GOPs or groups of GOPS in the experiential data stream to be replaced by altered content to accommodate parental controls, audience member's rating preferences, and/or to provide fine control over particular aspects of the presentation of the experiential data stream as regards sexual situations, violence, language and/or other aspects of the content.

Figure 20:
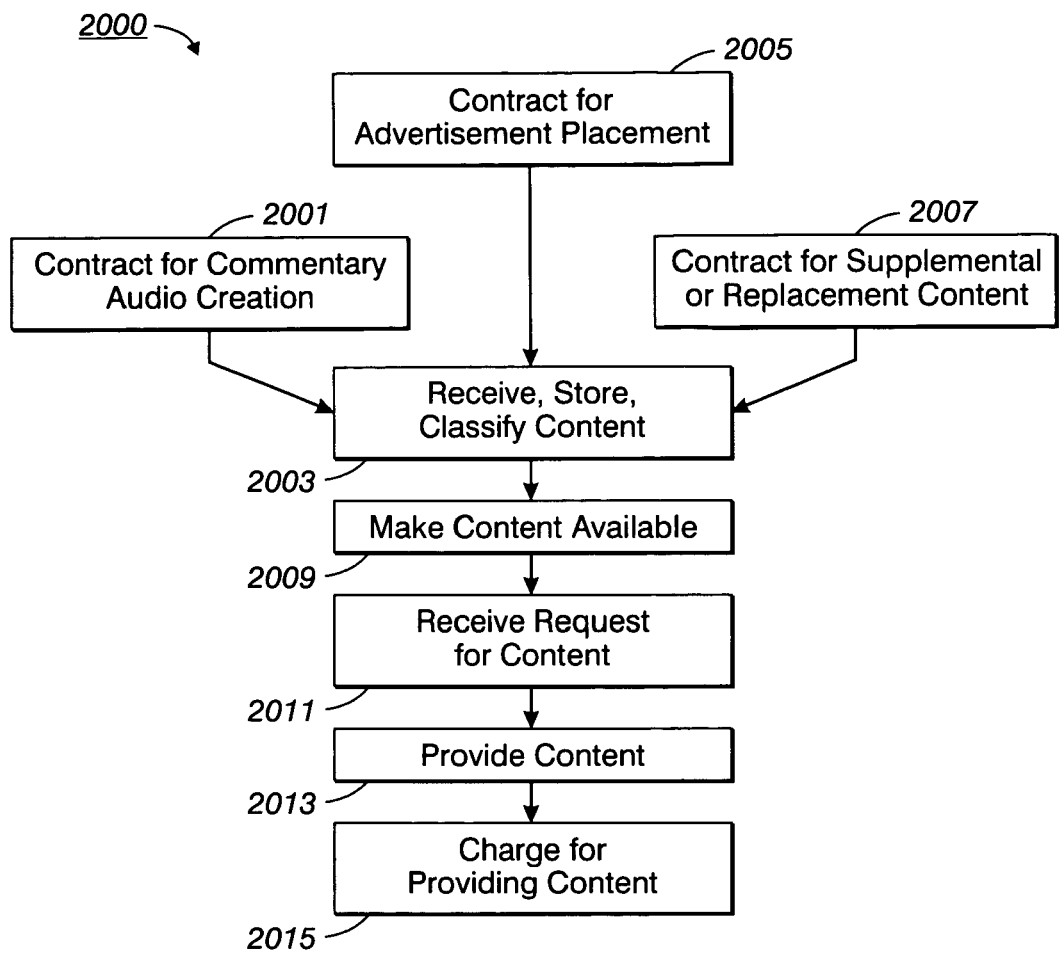
FIG. 20 illustrates a process for making commentary audio clip and/or replacement/additional content available.

FIG. 20 illustrates a process for providing commentary audio clip and/or replacement/additional content 2000. A 'contract for commentary audio clip' step 2001 arranges for the creation of commentary audio clips related to the experiential data stream by appropriate talent (the creator). The 'receive, store, and classify content' step 2003 receives the commentary audio clip or any other content (such as that created as a result of the 'contract for advertisement placement' step 2005 or the 'contract for replacement/additional content' step 2007) either electronically (over a network) or via a tangible computer-usable data carrier, stores the content in a networked computerized library or server system so that it can be made available to an audience member's device, and classifies the content as to its type, contractual obligations, and et cetera. A 'make content available' step 2009 then makes the content available to the public for purchase. A 'receive request for content' step 2011 receives a request at a networked computer system for the content either from the audience member's playback device, by an electronic order or by a paper order subsequently entered into the networked computer system. A 'provide requested content' step 2013 then provides the content to the customer. The content can be provided to the customer from the networked computer system over any computer usable data carrier including a network and/or tangible computer usable data carrier. The content can be conditioned using digital rights management to only be presented in conjunction with the corresponding experiential data stream for which the content was contracted. The networked computer system records the transaction information. Once the content is provided, the relevant entity can be billed for the delivery by a 'charge for providing content' step 2015.

In some embodiments, the optional program insertion provider service 433 can maintain demographic, preference, and/or use information about the audience members in the shared social space. With this information, the optional program insertion provider service 433 can provide replacement/additional content the selection of which is targeted to the viewing habits, personal preferences, or viewing habits of individual audience members as well as towards the shared social space itself.

One skilled in the art will understand that the experiential data stream can be an audio program, a video program, a multi-media program, or some combination of these types of programs. Such a one will also understand that the term replacement/additional content includes supplemental, replacement, additional, and/or commercial content.

One skilled in the art will understand that although the description herein is cast within a multi threaded paradigm that the techniques disclosed are applicable to other programming paradigms. One skilled in the art will understand that there are many different but equivalent ways to start the threads just as there are many different but equivalent ways to architect the embodiments (including different data flow and programming methodology, and the use of electronic circuit assists). Such a one will also understand that object-oriented, procedural programming, or other methodologies can also be used to implement the technology disclosed within.

In addition, state changes can be detected by periodically comparing a copy of the state with the current state from information sent by the audience members' devices over the control link. Another embodiment can detect a state-change event and respond to that event.

As used herein, a procedure is a self-consistent sequence of steps that can be performed by a programmed computer, specialized electronics or other circuitry or a combination thereof that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry.

One skilled in the art will understand that the network transmits information (such as data that defines a experiential data stream or commentary audio clip as well as data that defines a computer program). The information can also be embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

Communication between local audience members and remote audience members can also be accomplished using a keyboard or other mechanism to provide communication between the audience members.

The network 401 can be a broadcast network, a cable network, a satellite network, the Internet, a LAN or WAN or some combination of these. The video display component 413 can be a television set, a video monitor, a computer, et cetera One skilled in the art will understand that this disclosure teaches fundamental aspects of establishing a shared social space, of the devices, methods, systems, products, and business methods to establish, maintain, and exploit the shared social space as well as techniques that can be used in a local social space.

From the foregoing, it will be appreciated that the disclosed technology has (without limitation) the following advantages:

1) The ability for a local device to automatically become subordinate to the audience member's conversations.
2) The ability to defer an audience member's transitory audio for presentation such that such presentation will minimally disrupt the presentation of the experiential data stream.
3) The ability to delay and/or adjust the playback speed of the experiential data stream to accommodate conversations among the audience members.
4) The ability to present commentary audio clips from remote audience members at the point in the experiential data stream where the remote audience members made the utterance.
5) The ability to assemble multiple commentary audio clips to create a commentary by the audience members on the experiential data stream.
6) The ability to synchronize the presentation of the experiential data stream for the local audience members and the remote audience members in the shared social space to simulate the experience of locally watching the experiential data stream by all audience members.
7) The ability to assemble the shared social space.
8) The ability to synchronize presentation of the experiential data stream with that of a remote audience member without losing the social-context of the shared social space while synchronizing.
9) The ability to allow audience members to independently navigate the experiential data stream without significantly breaking the shared social space.
10) The ability to provide programming that adapts to the audience members attention.
11) The ability to provide a socially-aggregated soundtrack (i.e. synthetic laughtrack based on the sum of my friend's reactions, not from a canned audience).
12) The ability to purchase and present professional commentary about the experiential data stream.
13) The ability to selectively present replacement content, supplemental content, masked content, and advertising content with the presentation of the experiential data stream.

Although the presently claimed technology has been described in terms of the presently preferred embodiments, one skilled in the art will understand that various modifications and alterations may be made without departing from the scope of the claims. Accordingly, the scope of the claims is not to be limited to the particular embodiments discussed herein.

What is claimed follows:

1. A computer controlled method configured to provide supplemental content to be presented with a presentation of an experiential data stream in a shared social space, said method comprising:
   receiving a request to provide said content, said content configured to be included in said presentation of said experiential data stream, wherein a respective audience member in said shared social space has at least partially a prerecorded version of said experiential data stream that is substantially the same as that recorded by other audience members;
   determining one or more content parameters related to said request;
   selecting said content responsive to the step of determining;
   providing said content to audience members;
   wherein said content is structured to be able to be presented in conjunction with at least one prerecorded portion of said experiential data stream, presented either in addition to said at least one prerecorded portion of said experiential data stream, or to replace a targeted portion of said prerecorded portion of said experiential data stream; and
   wherein the step of providing said content further comprises:
      receiving state information and a group of pictures (GOP) alignment identifications from an audience member's device;
      updating the state information of the device;
      determining whether the device is tracking the playback position of a remote device; and
      adjusting playback vector of the experiential data stream for the device.

2. The computer controlled method of claim 1, wherein said request is invoked by an audience member.

3. The computer controlled method of claim 1, wherein said request specifies a delivery mode for providing said content.

4. The computer controlled method of claim 1, wherein the step of providing said content further comprises:
   accessing said content;
   sending said content over a network to satisfy said request.

5. The computer controlled method of claim 1, wherein the step of providing said content further comprises shipping a tangible computer-usable data carrier having said content embodied within to satisfy said request.

6. The computer controlled method of claim 1, wherein the step of selecting is at least partially responsive to a preference specified by an audience member.

7. The computer controlled method of claim 1, wherein the step of selecting is at least partially responsive to a preference specified by an advertisement provider.

8. The computer controlled method of claim 1, wherein the step of selecting is at least partially responsive to demographic information.

9. The computer controlled method of claim 1, wherein said content is a commentary audio clip.

10. The computer controlled method of claim 9, wherein said commentary audio clip contains analysis audio, opinion audio, critical audio, parody audio, entertainment audio, participant audio related to said experiential data stream; or advertising audio.

11. The computer controlled method of claim 1, wherein said content is replacement/additional content.

12. The computer controlled method of claim 11, wherein said replacement/additional content is supplemental content for said experiential data stream, replacement content for said experiential data stream, additional content for said experiential data stream, or commercial content.

13. The computer controlled method of claim 11, wherein said replacement/additional content is an advertisement.

14. The computer controlled method of claim 11, wherein said replacement/additional content is related to said targeted portion of said experiential data stream.

15. The computer controlled method of claim 14, wherein said replacement/additional content is a parody content related to said experiential data stream, is additional content available but omitted from said experiential data stream, or is content having a different parental rating than the corresponding content in said targeted portion.

16. A computer-readable storage medium storing instructions which when executed by a computer, cause said computer to perform a method comprising:
receiving a request to provide said content, said content configured to be included in said presentation of said experiential data stream, wherein each audience member in said shared social space has at least partially a prerecorded version of said experiential data stream that is substantially the same as that recorded by other audience members;
determining one or more content parameters related to said request;
selecting said content responsive to the step of determining;
providing said content; and
wherein said content is structured to be able to be presented in conjunction with at least one prerecorded portion of said experiential data stream, presented either in addition to said at least one prerecorded portion of said experiential data stream, or replacing a targeted portion of said prerecorded portion of said experiential data stream; and
wherein the step of providing said content further comprises:
receiving state information and a group of pictures (GOP) alignment identifications from an audience member's device;
updating the state information of the device;
determining whether the device is tracking the playback position of a remote device; and
adjusting playback vector of the experiential data stream for the device.

17. The computer program product of claim 16, wherein said request is invoked by an audience member.

18. The computer program product of claim 16, wherein said request specifies a delivery mode for providing said content.

19. The computer program product of claim 16, wherein the step of providing said content further comprises:
accessing said content;
sending said content over a network to satisfy said request.

20. The computer program product of claim 16, wherein the step of providing said content further comprises shipping a tangible computer-usable data carrier having said content embodied within to satisfy said request.

21. The computer program product of claim 16, wherein the step of selecting is at least partially responsive to a preference specified by an audience member.

22. The computer program product of claim 16, wherein the step of selecting is at least partially responsive to a preference specified by an advertisement provider.

23. The computer program product of claim 16, wherein the step of selecting is at least partially responsive to demographic information.

24. The computer program product of claim 16, wherein said content is a commentary audio clip.

25. The computer program product of claim 24, wherein said commentary audio clip contains analysis audio, opinion audio, critical audio, parody audio, entertainment audio, participant audio related to said experiential data stream; or advertising audio.

26. The computer program product of claim 16, wherein said content is replacement/additional content.

27. The computer program product of claim 26, wherein said replacement/additional content is supplemental content for said experiential data stream, replacement content for said experiential data stream, additional content for said experiential data stream, or commercial content.

28. The computer program product of claim 26, wherein said replacement/additional content is an advertisement.

29. The computer program product of claim 26, wherein said replacement/additional content is related to said targeted portion of said experiential data stream.

30. The computer program product of claim 29, wherein said replacement/additional content is a parody content related to said experiential data stream, is additional content available but omitted from said experiential data stream, or is content having a different parental rating than the corresponding content in said targeted portion.

31. An apparatus configured to deliver supplemental content to be presented with a presentation of an experiential data stream in a shared social space, said apparatus comprising:
a network interface;
a receiver configured receive to a request to provide said content, said content configured to be included in said presentation of said experiential data stream, the receiver in communication with the network interface, wherein each audience member in said shared social space has at least partially a prerecorded version of said experiential data stream that is substantially the same as that recorded by other audience members;
a determination logic configured to determine one or more content parameters related to said request;
a content selection logic configured to select said content responsive to the determination logic;
a request fulfillment logic configured to initiate delivery of said content; and
wherein said content is structured to be able to be presented in conjunction with at least one prerecorded portion of said experiential data stream, presented either in addition to said at least one prerecorded portion of said experiential data stream, or replacing a targeted portion of said prerecorded portion of said experiential data; and
wherein the request fulfillment logic further comprises:
a receiving logic configured to receive state information and a group of pictures (GOP) alignment identifications from an audience member's device;
an updating logic configured to update the state information of the device;
a determination logic configured to determine whether the device is tracking the playback position of a remote device; and
an adjustment logic configured to adjust playback vector of the experiential data stream for the device.

32. The apparatus of claim 31, wherein said request is invoked by an audience member.

33. The apparatus of claim 31, wherein said request specifies a delivery mode for providing said content.

34. The apparatus of claim 31, wherein the request fulfillment logic further comprises:
an access logic configured to access said content;
a communication logic configured to send said content over said network to satisfy said request.

35. The apparatus of claim 31, wherein the request fulfillment logic further comprises a shipping notification logic configured to initiate a shipment of a tangible computer-usable data carrier having said content embodied within to satisfy said request.

36. The apparatus of claim 31, wherein the content selection logic is at least partially responsive to a preference specified by an audience member.

37. The apparatus of claim 31, wherein the content selection logic is at least partially responsive to a preference specified by an advertisement provider.

38. The apparatus of claim 31, wherein the content selection logic is at least partially responsive to demographic information.

39. The apparatus of claim 31, wherein said content is a commentary audio clip.

40. The apparatus of claim 39, wherein said commentary audio clip contains analysis audio, opinion audio, critical audio, parody audio, entertainment audio, participant audio related to said experiential data stream; or advertising audio.

41. The apparatus of claim 31, wherein said content is replacement/additional content.

42. The apparatus of claim 41, wherein said replacement/additional content is supplemental content for said experiential data stream, replacement content for said experiential data stream, additional content for said experiential data stream, or commercial content.

43. The apparatus of claim 41, wherein said replacement/additional content is an advertisement.

44. The apparatus of claim 41, wherein said replacement/additional content is related to said targeted portion of said experiential data stream.

45. The apparatus of claim 44, wherein said replacement/additional content is a parody content related to said experiential data stream, is additional content available but omitted from said experiential data stream, or is content having a different parental rating than the corresponding content in said targeted portion.

* * * * *